(12) United States Patent
Chang et al.

(10) Patent No.: US 7,462,675 B2
(45) Date of Patent: Dec. 9, 2008

(54) THERMOPLASTIC COPOLYMER OF TETRAFLUOROETHYLENE AND PERFLUOROMETHYL VINYL ETHER AND MEDICAL DEVICES EMPLOYING THE COPOLYMER

(75) Inventors: James W. Chang, Flagstaff, AZ (US); Jack Hegenbarth, Wilmington, DE (US); Jon P Moseley, Flagstaff, AZ (US); Huey Shen Wu, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/227,658

(22) Filed: Sep. 14, 2005

(65) Prior Publication Data

US 2006/0041091 A1 Feb. 23, 2006

Related U.S. Application Data

(63) Continuation of application No. 10/382,157, filed on Mar. 4, 2003, now Pat. No. 7,049,380, which is a continuation of application No. 09/653,210, filed on Aug. 31, 2000, now abandoned, which is a continuation of application No. 09/233,368, filed on Jan. 19, 1999, now abandoned.

(51) Int. Cl.
*C08F 214/26* (2006.01)
(52) U.S. Cl. .................. 526/247; 526/206; 528/488
(58) Field of Classification Search .......... 526/247, 526/206; 528/488
See application file for complete search history.

(56) References Cited

U.S. PATENT DOCUMENTS

| | | | |
|---|---|---|---|
| 3,051,683 A | 8/1962 | Mallouk | |
| 3,132,123 A | 5/1964 | Harris et al. | |
| 3,467,638 A | 9/1969 | Pattison | |
| 3,484,503 A | 12/1969 | Magner et al. | ............... 260/900 |

(Continued)

FOREIGN PATENT DOCUMENTS

CA 894898 3/1972

(Continued)

OTHER PUBLICATIONS

Barney Al et al. A High-Performance Fluorocarbon Elastomer. Journal of Polymer Science 1970; 8:1091-1098.

(Continued)

*Primary Examiner*—Peter D. Mulcahy
*Assistant Examiner*—Henry Hu
(74) *Attorney, Agent, or Firm*—Wayne D. House

(57) ABSTRACT

An improved elastomeric material is described comprising an essentially noncross-linkable amorphous copolymer of tetrafluoroethylene (TFE) and perfluoromethyl vinyl ether (PMVE) which is both a thermoplastic and exhibits exceptional mechanical properties. This material is particularly suitable for use in ultra-clean environments, and particularly for use in an implantable device, since it does not contain contaminants that previous thermoset TFE/PMVE copolymers have required. Among the improved properties of the present invention are excellent biocompatibility, high matrix tensile strength, high clarity, high abrasion resistance, high purity, adequate elasticity, and ease of processing due to the thermoplastic, and noncross-linkable structure of the copolymer. The material of the present invention is also a high strength bonding agent particularly suited for bonding porous PTFE to itself or to other porous substances at room or elevated temperatures.

20 Claims, 18 Drawing Sheets

U.S. PATENT DOCUMENTS

| | | | |
|---|---|---|---|
| 3,635,926 A | 1/1972 | Gresham et al. ............ 260/87.5 |
| 3,682,872 A | 8/1972 | Brizzolara et al. |
| 4,133,927 A | 1/1979 | Tomoda et al. |
| 4,138,426 A | 2/1979 | England ................... 260/465.6 |
| 4,194,041 A | 3/1980 | Gore et al. |
| 4,196,256 A | 4/1980 | Eddy et al. ................... 428/422 |
| 4,279,245 A | 7/1981 | Takagi et al. |
| 4,281,092 A | 7/1981 | Breazeale |
| 4,304,010 A | 12/1981 | Mano |
| 4,316,836 A | 2/1982 | Aufdermarsh, Jr. |
| 4,380,618 A | 4/1983 | Khan et al. ................. 526/206 |
| 4,387,168 A | 6/1983 | Morita ........................ 521/54 |
| 4,394,489 A | 7/1983 | Aufdermarsh |
| 4,413,094 A | 11/1983 | Aufdermarsh, Jr. |
| 4,443,511 A | 4/1984 | Worden et al. |
| RE31,618 E | 7/1984 | Mano et al. |
| 4,487,903 A | 12/1984 | Tatemoto et al. ............ 526/247 |
| 4,520,170 A | 5/1985 | Kitto |
| 4,525,539 A | 6/1985 | Feiring |
| 4,529,784 A | 7/1985 | Finlay |
| 4,576,869 A | 3/1986 | Malhotra .................... 428/502 |
| 4,600,651 A | 7/1986 | Aufdermarsh et al. |
| 4,619,641 A | 10/1986 | Schanzer |
| 4,670,328 A | 6/1987 | Kawachi et al. ............ 428/260 |
| 4,692,369 A | 9/1987 | Nomi |
| 4,713,418 A | 12/1987 | Logothetis et al. |
| 4,764,560 A | 8/1988 | Mitchell |
| 4,816,339 A | 3/1989 | Tu et al. |
| 4,859,836 A | 8/1989 | Lunk et al. .................. 219/548 |
| 4,864,006 A | 9/1989 | Giannetti et al. ........... 526/209 |
| 4,875,468 A | 10/1989 | Krauter et al. |
| 4,882,113 A | 11/1989 | Tu et al. |
| 4,891,407 A | 1/1990 | Mitchell |
| 4,897,457 A | 1/1990 | Nakamura et al. .......... 526/247 |
| 4,904,726 A | 2/1990 | Morgan et al. .............. 524/520 |
| 4,910,276 A | 3/1990 | Nakamura et al. .......... 526/247 |
| 4,935,467 A | 6/1990 | Cheng et al. |
| 4,945,125 A | 7/1990 | Dillon et al. |
| 4,955,899 A | 9/1990 | Dell Corna et al. |
| 4,982,009 A | 1/1991 | Hung ......................... 568/615 |
| 4,983,697 A | 1/1991 | Ojakaar |
| 5,001,278 A | 3/1991 | Oka et al. |
| 5,059,720 A | 10/1991 | Hung ......................... 568/674 |
| 5,061,276 A | 10/1991 | Tu et al. |
| 5,071,609 A * | 12/1991 | Tu et al. ...................... 264/119 |
| 5,100,422 A | 3/1992 | Berguer et al. |
| 5,104,400 A | 4/1992 | Berguer et al. |
| 5,122,441 A | 6/1992 | Lawton et al. .............. 430/320 |
| 5,152,782 A | 10/1992 | Kowligi et al. |
| 5,180,803 A * | 1/1993 | Gibbard ...................... 528/488 |
| 5,192,310 A | 3/1993 | Herweck et al. |
| 5,217,797 A | 6/1993 | Knox et al. |
| 5,219,904 A | 6/1993 | Abe ............................ 524/83 |
| 5,256,747 A | 10/1993 | Ojakaar et al. |
| 5,266,639 A | 11/1993 | Chapman, Jr. et al. ...... 525/200 |
| 5,268,405 A | 12/1993 | Ojakaar et al. |
| 5,310,838 A | 5/1994 | Hung et al. ................. 526/245 |
| 5,320,888 A | 6/1994 | Stevens |
| 5,328,946 A | 7/1994 | Tuminello et al. .......... 524/462 |
| 5,364,699 A | 11/1994 | Hollenbaugh et al. |
| 5,376,441 A | 12/1994 | Wu et al. |
| 5,385,694 A | 1/1995 | Wu et al. |
| 5,422,159 A | 6/1995 | Fagan |
| 5,460,872 A | 10/1995 | Wu et al. |
| 5,461,107 A | 10/1995 | Amin et al. ................. 524/495 |
| 5,461,129 A * | 10/1995 | Kurihara et al. ............ 526/247 |
| 5,463,006 A | 10/1995 | Abusleme ................... 526/247 |
| 5,464,904 A | 11/1995 | Chapman, Jr. et al. ...... 525/200 |
| 5,466,252 A | 11/1995 | Soukup et al. |
| 5,478,902 A * | 12/1995 | Yamamoto et al. ......... 526/247 |
| 5,523,346 A | 6/1996 | Wu |
| 5,529,820 A | 6/1996 | Nomi et al. |
| 5,539,047 A | 7/1996 | Wu et al. |
| 5,539,072 A | 7/1996 | Wu |
| 5,543,217 A | 8/1996 | Morgan ...................... 428/375 |
| 5,552,219 A | 9/1996 | Vita et al. |
| 5,554,680 A | 9/1996 | Ojakaar ...................... 524/496 |
| 5,565,512 A | 10/1996 | Saito et al. |
| 5,589,557 A | 12/1996 | Navarrini et al. ............ 526/247 |
| 5,612,419 A * | 3/1997 | Arcella et al. ............... 525/252 |
| 5,677,366 A | 10/1997 | Wu |
| 5,696,189 A | 12/1997 | Legare ....................... 524/232 |
| 5,702,441 A | 12/1997 | Zhou ............................ 623/6 |
| 5,708,044 A * | 1/1998 | Branca ....................... 521/145 |
| 5,741,323 A | 4/1998 | Pathak ........................ 623/1 |
| 5,877,264 A | 3/1999 | Logothetis et al. ........... 526/86 |
| 5,919,878 A * | 7/1999 | Brothers et al. ............. 526/247 |
| 5,973,091 A | 10/1999 | Schmiegel .................. 526/247 |
| 5,986,012 A | 11/1999 | Legare et al. ............... 525/326 |
| 6,140,437 A | 10/2000 | Kitaichi et al. .............. 526/247 |
| 6,211,319 B1 | 4/2001 | Schmiegel .................. 526/292 |
| 6,248,823 B1 | 6/2001 | Hrivnak et al. .............. 524/462 |
| 6,329,469 B1 | 12/2001 | Bowers et al. .............. 526/264 |
| 6,531,559 B1 | 3/2003 | Smith et al. ................. 526/255 |
| 6,939,593 B2 | 9/2005 | Wang ...................... 428/36.91 |
| 2005/0125054 A1 | 6/2005 | Bhat et al. |

FOREIGN PATENT DOCUMENTS

| | | |
|---|---|---|
| DE | 4131746 | 9/1991 |
| EP | 293090 | 4/1987 |
| EP | 256748 | 2/1988 |
| EP | 269449 | 6/1988 |
| EP | 818489 | 1/1998 |
| JP | 54-74514 | 11/1977 |
| JP | 59-25725 | 8/1982 |
| JP | 2002-293953 | 10/2002 |
| RU | 2071479 | 1/1997 |
| WO | 9118930 | 12/1991 |
| WO | 9402185 | 2/1994 |
| WO | 9624625 | 8/1996 |
| WO | 9941313 | 2/1998 |
| WO | 9811146 | 3/1998 |
| WO | 0008071 | 2/2000 |

OTHER PUBLICATIONS

Barney Al et al. Vulcanizate Properties From A New Perfluoroelastomer. Rubber Chemistry and Technology 1971; 44(3):660-667.

Berman M et al. The use of GORE-TEX® e-PTFE Bonded To Silicone Rubber As An Alloplastic Implant Material. Laryngoscope 1986; 96(5):480-483.

Carlson, PD et al. Fluoropolymers, Organic. Ullmann's Encyclopedia of Industrial Chemistry 1988; vol. A 11: 393, 423-427.

DuPont Dow elastomers-Kalrez®. Copyright 1999 DuPont Dow Elastomers.

Hyflon® PFA technical brochure. Aussimont USA, Inc., 1991.

Hyflon® MFA Perfluoropolymer technical brochure. Aussimont USA, Inc., May 1998.

Hyflon® MFA 601X PFA 7010 powder coating manual. Aussimont USA, Inc., Oct. 1998.

Kalb GH et al. A New Engineering Material For Advanced Design Concepts. Applied Polymer Symposium 1973; 22:127-142.

Kalb GH et al. Terpolymers of Tetrafluoroethylene, Perfuoro (Methyl Vinyl Ether) and Certain Cure Site Monomers. Polymer Preprints 1972; 13(1):490-492.

Kalb GH et al. Terpolymers of Tetrafluoroethylene, Perfluoro (Methyl Vinyl Ether) and Certain Cure Site Monomers. In: *Polymerization Reactions And New Polymers*, ed. Platzner, Norbert A.J. Published by American Chemical Societh 1973; 13-26.

Kalrez® perfluoroelastomer parts. Physical Properties and Compound Comparisons. Copyright 1996, 1998 DuPont Dow Elastomers.

Kalrez® perfluoroelastomer parts. Compound Selection Guide. Copyright 1997 DuPont Dow Elastomers.

Kalrez® makes seals you can bank on. Copyright 1998 DuPont Dow Elastomers.

Legare JM et al. Characterization of Elemental Extractables In Perfluoroelastomer and Fluoroelastomer Sealing Materials. Microcontamination Conference Proceedings 1993; 36-46.

Logothetis AL Chemistry of Fluorocarbon Elastomers. Prog. Polym. Sci. 1989; 14:251-296.

Logothetis AL Perfluoroelastomers And Their Functionalization. In: *Macromolecular Design Of Polymeric Materials*, ed. Hatada K, Kitayama T, Vogl O. New York: Marcel Dekker, Inc. 1997; 447-455.

Marshall JB Kalrez© -Type Perfluoroelastomers—Synthesis, Properties and Applications. In: *Modern Fluoropolymers*, ed. Scheirs J. New York 1997; 349-358.

Vita G and Pozzoli M. MFA: A New Perfluoropolymer for Wire & Cable Applications. International Wire and Cable Symposium Proceedings 1995; pp. 809-816.

\* cited by examiner

THERMOPLASTIC COPOLYMER OF TETRAFLUOROETHYLENE AND PERFLUOROMETHYL VINYL ETHER AND MEDICAL DEVICES EMPLOYING THE COPOLYMER

CROSS REFERENCE TO RELATED APPLICATIONS

This application is a continuation of application Ser. No. 10/382,157 filed Mar. 4, 2003 (now U.S. Pat. No. 7,049,380), which is a continuation of application Ser. No. 09/653,210 filed Aug. 31, 2000 (abandoned) which is a continuation of application Ser. No. 09/233,368 filed Jan. 19, 1999 (abandoned).

FIELD OF THE INVENTION

The invention relates to a thermoplastic noncross-linkable copolymer of tetrafluoroethylene and perfluoromethyl vinyl ether and medical applications of the copolymer.

BACKGROUND OF THE INVENTION

Fluorinated polymers are well known for their physical properties such as corrosion resistance, low coefficients of friction, chemical resistance, and thermal stability. An example of such a fluoropolymer is polytetrafluoroethylene (PTFE), which is widely used in medical and industrial applications. PTFE has an extremely high melt viscosity, which makes processing by melt fabrication or injection molding very difficult. Full density PTFE is also generally non-elastic or semi-rigid, making it unsuitable for applications requiring some degree of elasticity.

Elastomeric fluoropolymers, such as KALREZ® elastomer available from E. I. duPont de Nemours & Co., combine the advantages of a fluoropolymer with the mechanical aspects of an elastomer. The mechanical and elastomeric properties of such materials are, however, a result of the cross-linking or curing, which improves strength and recovery, and renders the polymer a thermoset. The incorporation of a cross-linking system, which improves elastomeric properties of the thermoset, requires additional monomers to be added during polymer synthesis, and cross-linking agents to be added during milling and compounding steps. The compound is subsequently molded and heat treated to form the final article. This heat treatment is also known as curing or vulcanization. Biocompatibility of the final product is compromised by toxic agents and additives necessary for cross-linking. heat treatment is also known as curing or vulcanization. Biocompatibility of the final product is compromised by toxic agents and additives necessary for cross-linking.

In U.S. Pat. No. 3,132,123 to Harris et al., assigned to E. I. Du Pont de Nemours & Co. Inc., a semi-crystalline copolymer of tetrafluoroethylene (TFE) and perfluoromethyl vinyl ether (PMVE) is disclosed. This copolymer of TFE and PMVE was prepared in an attempt to develop a plastic material having the desirable physical properties of PTFE without the undesirable high melt viscosity, which makes melt processing of the polymer very difficult. Thus, these efforts focused on the development of a melt-processable, injection moldable PTFE substitute. The copolymer disclosed had low levels of PMVE (approximately 11% by weight), which is sufficient to yield a melt viscosity lower than PTFE but not sufficient to make the polymer amorphous. This, in turn, would enhance the ease of fabrication by injection molding. The biocompatibility of this copolymer was not addressed nor suggested.

Subsequent development efforts relating to the copolymer of TFE and PMVE focused on cross-linking systems, for the purpose of enhancing the mechanical properties and imparting elastomeric properties to the polymer. In publications by Du Pont, Kalb et al., "A New Engineering Material for Advanced Design Concepts," *Applied Polymer Symposium* No. 22, 127-142 (1973), and Barney, et al., "A High-Performance Fluorocarbon Elastomer," *Journal of Polymer Science*, Part A-1, Vol. 8, 1091-1098 (1970), the need as well as the difficulty of cross-linking the TFE and PMVE polymer is disclosed. These publications focus on the search for a third monomer, to be copolymerized with the TFE and PMVE, that would provide a site for vulcanization or chemical cross-linking. Barney, et al., discloses a tensile strength of 675 psi for the uncured, noncross-linked terpolymers in the form of a gum. These and similar development efforts led to the commercialization of KALREZ® elastomer, which is a thermoset, cross-linked terpolymer, containing monomers of TFE, PMVE and additional other monomers. Similar thermoset, cross-linked, terpolymers have been developed and are commercially available under the trade names CHEMRAZ® and DAI-EL PERFLUOR®. Although possessing good mechanical properties, these cross-linked systems are not suitable for medical applications, particularly implantable medical devices, due to the known toxicity of the additives.

All known copolymers containing TFE and PMVE comonomers commercially available in final form (e.g., O-rings, sealants and gaskets) are cross-linked materials containing additives and fillers. Noncross-linked resins or articles of these copolymers (generally terpolymers) are typically in the form of gums. These gums generally have low molecular weight and poor mechanical properties. They are not useful until cross-linked. The lack of commercially available resins of amorphous thermoplastic copolymers of TFE and PMVE has hindered thorough biocompatibility testing of this copolymer. To the knowledge of the present inventors, there have been no publications citing efforts to test or determine the biocompatibility of a noncross-linkable, thermoplastic copolymer of TFE and PMVE. There have only been generalized references relating to the biocompatibility of plastics made from copolymers of TFE and a perfluoroalkyl-vinyl-ether, or a perfluoroalkoxy-vinyl-ether (see, e.g., Homsy, "Biocompatibility of Perfluorinated Polymers and Composites of these Polymers," *Biocompatibility of Clinical Implant Materials*, Volume II, Chapter 3, pp. 59-77 (1981)).

Presently there is dearth of suitable implantable elastomeric materials. Currently available elastomers in this field are predominantly silicones and polyurethanes, which have well documented deficiencies related to long term stability in-vivo and mechanical weakness. These deficiencies may include adverse foreign body reactions, biological response to leachable species, particulation concerns, long-term embrittlement and stress cracking. In addition, these polymers are thermosetting elastomers, which have known limitations in processability. Disclosed in U.S. Pat. No. 4,816,339 to Tu et al. are articles of expanded PTFE (ePTFE) combined with thermoset elastomers. Various thermoset elastomers are disclosed including copolymers of TFE and PMVE in cross-linked or cured forms. These elastomers are believed to suffer from similar deficiencies as those outlined above.

Thus it would be desirable to provide a perfluoropolymer in a pure, noncross-linkable, thermoplastic, amorphous form. Such a perfluoropolymer could ideally have elastic properties, high tensile strength, high purity, excellent clarity and abrasion resistance along with ease of processing.

SUMMARY OF THE INVENTION

The copolymer of the present invention is a copolymer of tetrafluoroethylene (TFE) and perfluoromethyl vinyl ether (PMVE) that is uniquely formed to have excellent mechanical properties while being substantially noncross-linkable, i.e., free of cross-linking monomers and curing agents. "Noncross-linkable" as used herein means that the copolymer is free of cross-linking monomers and curing agents. Such an amorphous and noncross-linkable material is believed to be particularly useful as a biomaterial. The copolymer contains between 40 and 80 weight percent PMVE units and complementally between 60 and 20 weight percent TFE units. The lack of cross-linking systems ensures that the material is highly pure and, unlike previous thermoset TFE/PMVE elastomers, is ideally suited as an implantable biomaterial. Advantages of the present invention include excellent biocompatibility, high tensile strength, high clarity, high abrasion resistance, high purity, adequate elasticity, and ease of processing due to the thermoplastic and noncross-linkable structure of the copolymer. The copolymer of the present invention is thermoplastic and amorphous. It also is of high strength and can be used as a bonding agent particularly suited for bonding porous PTFE to itself or to other porous substances at room or elevated temperatures. It may also be used to bond nonporous materials including polymers such as nonporous PTFE.

The thermoplastic copolymer of the present invention is particularly useful as an advanced material for medical applications. The noncross-linkable form of the thermoplastic, poly(TFE-co-PMVE), displays surprisingly high tensile strengths. Tests demonstrate tensile strengths of over 90 MPa, compared to the typical published strengths of about 10 MPa or less for prior noncross-linked TFE/PMVE copolymers. Similarly, the biocompatibility data derived by chronic in vivo testing displays excellent results, as well as unexpectedly positive results regarding optical clarity and abrasion resistance. The lack of cross-linking agents in the copolymer of the invention allows the material to be readily purified to extremely low contaminant levels. Samples of the material of the present invention have exhibited contamination levels of less than 30 parts per billion.

The copolymer of the present invention can be used in a wide variety of medical and commercial applications. Medical applications include the incorporation of the inventive copolymer into long and short term implantable devices, as well as in disposable, or single use, supplies and devices. These applications include, but are not limited to, vascular grafts, surgical sheets, catheters, space filling or augmentation devices, joint spacers, surface coatings for devices, lenses, work surface or clean room surface coatings, seals, gaskets, blood contact surfaces, bags, containers, fabric liners, and endoprostheses. In addition, the copolymer of the present invention can be used as a biocompatible bonding agent for fluoropolymers. Commercial applications include, but are not limited to, corrosion resistant liners for vessels or ducts, sealing members, inflatable devices, filters, membranes, fabric liners and as a fluoropolymer bonding agent. In addition the thermoplastic characteristics of the present invention allow the re-melting, reprocessing and recycling of various articles. The material can also be used with various fillers to particularly include therapeutic agents or drug delivery.

Figure 14A:
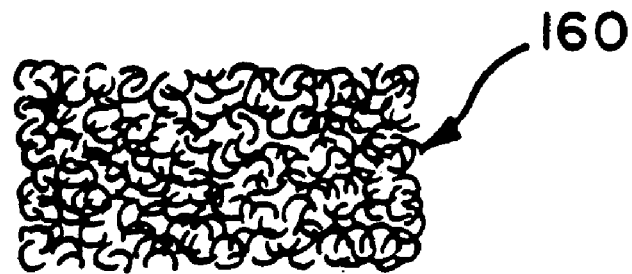
Figure 14B:
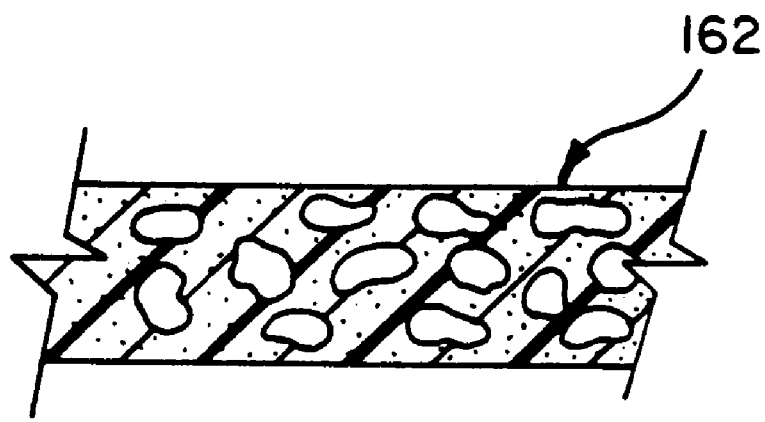

Shown in FIGS. 14A and 14B are porous, open and closed cell embodiments of the copolymer of the present invention.

Figure 14C:
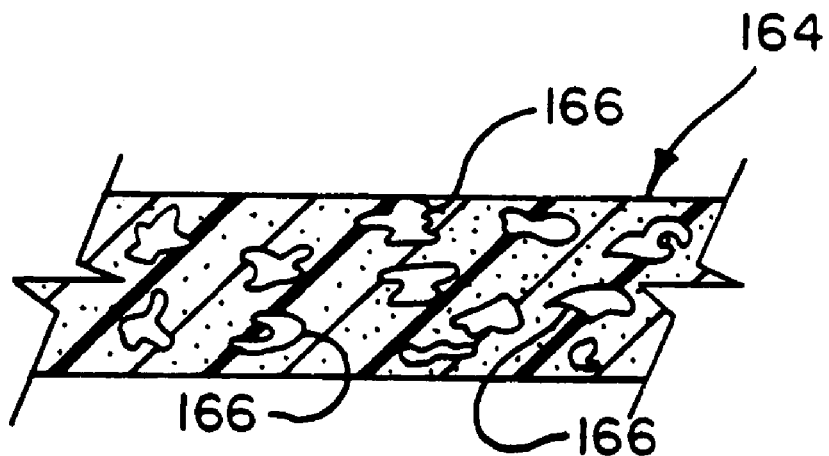

FIG. 14C shows a partial cross section of the copolymer of the present invention, having a material impregnated within.

Figure 15:
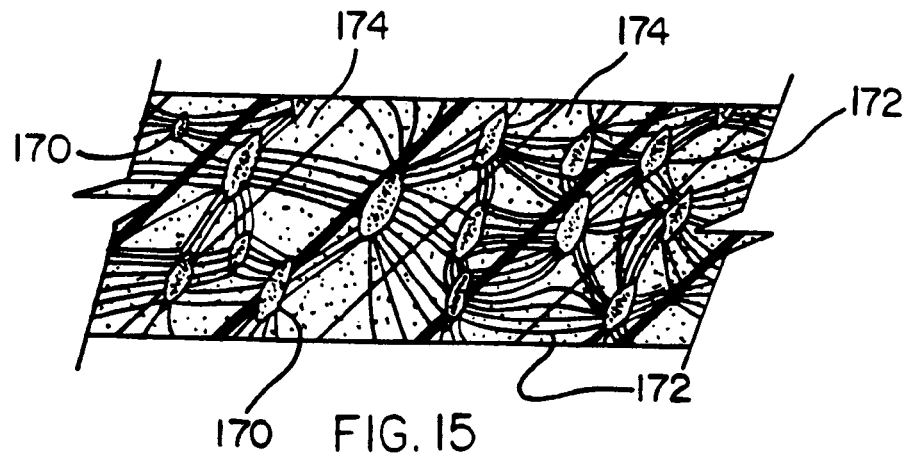

FIG. 15 shows a partial cross section of a material, having a node and fibril structure, imbibed with the copolymer of the present invention.

Figure 16:
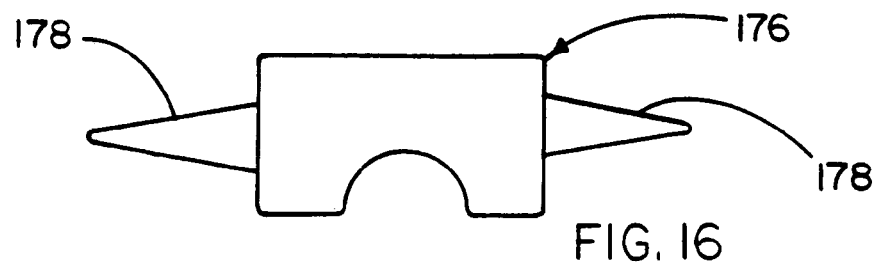

FIG. 16 shows a side view of a bone joint spacer having stems incorporating the copolymer of the present invention.

Figure 17A:
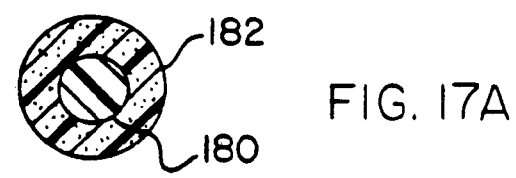

FIG. 17A shows a end view cross section of a support structure coated with the copolymer of the present invention.

Figure 17B:
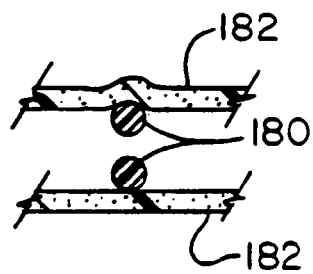
Figure 17C:
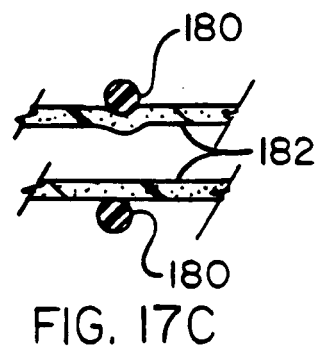

FIGS. 17B and 17C show partial cross sectional views of support structures externally or internally coated with the copolymer of the present invention.

Figure 18:
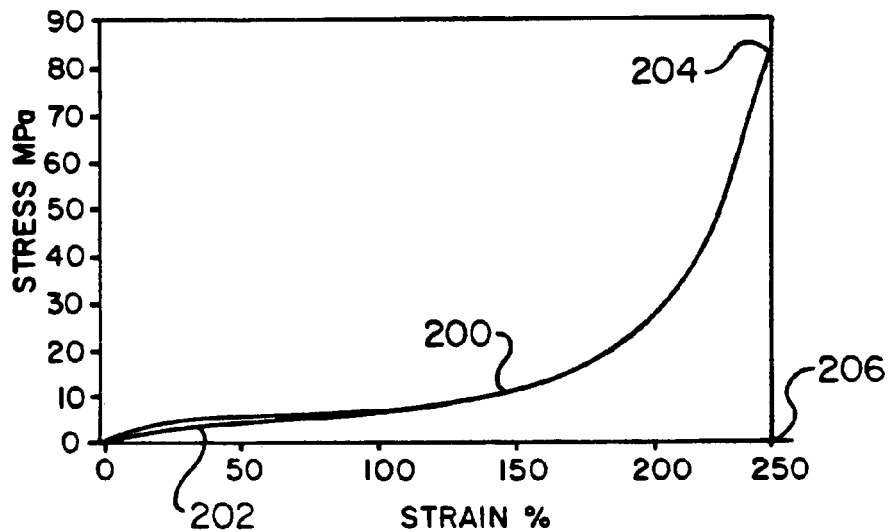

FIG. 18 shows a graph relating the stress and strain to break relation of the copolymer of the present invention.

Figure 19:
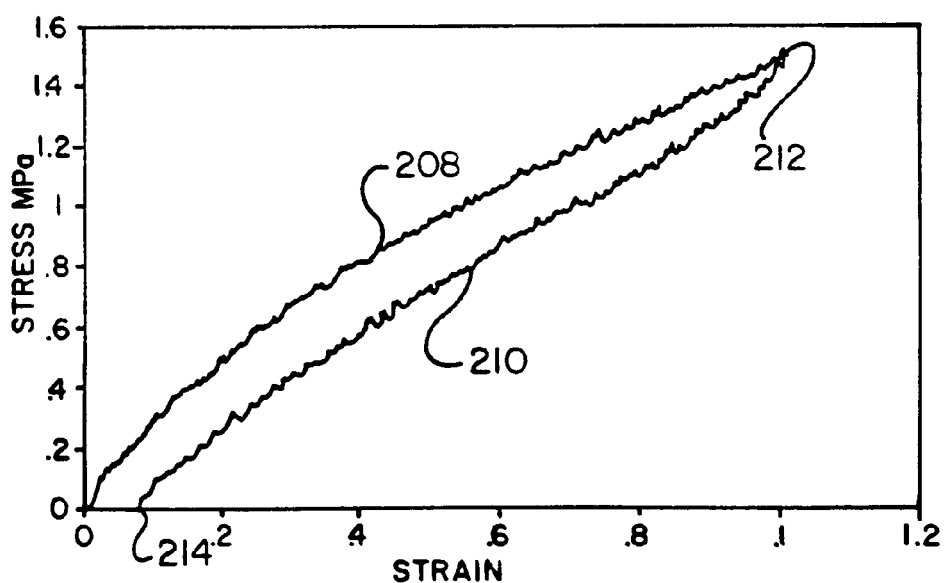

FIG. 19 shows a graph relating the stress and strain to 100% relation of the copolymer of the present invention.

DETAILED DESCRIPTION OF THE INVENTION

The method provided herein results in making an implantable, thermoplastic, non-curable form of poly(TFE-co-PMVE). The method provides an ultrapure, elastomeric thermoplastic, particularly suited for use in the medical applications and devices of the invention. Currently available elastomers in this field are predominantly silicones and polyurethanes, which have well documented deficiencies related to long term stability in vivo and mechanical weakness. These deficiencies include adverse foreign body reactions, biological response to leachable species, particulation concerns, long term embrittlement and stress cracking. In the present invention, a copolymer material is provided which is readily and economically processed to ultrapure levels, is highly biocompatible, displays elastic properties, has good tensile properties, and is a thermoplastic. This copolymer material is, therefore, ideally suited for medical grade applications including long term implants.

The copolymer of the present invention comprises a substantially noncross-linkable, amorphous copolymer of tetrafluoroethylene (TFE) and perfluoromethyl vinyl ether (PMVE). This copolymer is formed without cross-linking monomers or curing agents that are normally used to form TFE/PMVE copolymers as thermoset elastomers. As a result, the amorphous TFE/PMVE copolymer of the present invention comprises a unique thermoplastic elastomer, with all the benefits that a thermoplastic material can provide. Surprisingly, however, the material of the present invention has remarkably good mechanical properties, including tensile strength and hardness properties exceeding any previously reported noncross-linked TFE/PMVE material. Moreover, since cross-linking is not required, the copolymer of the present invention can be formed without the addition of cross-linking agents that can lead to device toxicity. The result is a new elastomeric copolymer that is particularly suitable for use as a biomaterial.

Due to the thermoplastic nature of this copolymer, it is possible to further process the polymer powder by a multitude of conventional methods. These processing methods include, for example, hot melt screw extrusion, heat compression, vacuum forming, calendering, various laminating processes, film or filament winding, dispersion spraying or dipping and injection molding. The polymer may also be rendered porous by methods such as the inclusion of foaming agents, dissolving impregnated particles or by forcing hot gasses through the thermoplastic. Articles further processed by these methods include two major groups; 1) articles consisting only of the polymer such as tubing or shapes, and 2) articles comprised of the polymer combined with other materials, such as laminated articles and filled articles.

The first group of articles, consisting only of the copolymer, includes but is not limited to such items as medical grade tubing, high purity sheets, trays, flexible containers, forms such as rods, filters or gaskets, gloves, protective garments, implantable lenses and other implantable prosthetic devices such as finger joint replacements or tissue augmentation devices. The use of such devices is not limited to medical applications. For example these devices may have a variety of applications in semiconductor manufacturing, chemical handling, electronic assembly or in any clean room environment. Another property of this polymer is the ability to form high strength bonds between porous polymers, particularly porous polytetrafluoroethylene. In this type of bonding application, a polymer solution is simply wetted onto the surfaces to be bonded, the surfaces are then brought into contact. After the solvent is evaporated off, a high strength bond is formed between the surfaces even if the bond is performed at room temperature. The polymer of the invention can be used to impregnate partially or fully into porous polytetrafluoroethylene, especially microporous expanded polytetrafluoroethylene, to form useful composite materials.

The copolymer of this invention can also be blended with fillers such as silica, titanium dioxide, carbon black, therapeutic agents and the like or other types of fluorinated polymer resin powders.

The second group of articles, comprising the polymer combined with other materials, includes but is not limited to such items as chemical resistant surface coatings or linings, surface coatings which enhance the device biocompatibility, sheathing for implantable electrical cables such as pacemaker/defibrillator leads and electrical insulation conformable coatings or cable coatings. Other applications include, without limitation, laminated devices such as elastomeric layered vascular grafts, surgical sheets and dura mater substitutes. The elastomeric properties of this polymer, when combined with an implantable graft or sheet, can result in reduced suture hole bleeding or leaking and shorter time to hemostasis. The elastomeric properties can also be used to impart compliance and resilience into these devices. Again, the use of such devices is not limited to medical applications. For example these devices have a multitude of applications in semiconductor manufacturing, chemical handling, electronic assembly or in any clean room environment.

The term "amorphous" as used herein is defined (from the Polymer Science Dictionary, Second Edition, Mark Alger (Chapman & Hall)) as a polymer in which the molecular chains exist in the random coil conformation; since there is no regularity of structure, there is no crystallinity.

Crystallinity can be detected by thermal/calorimetric techniques which measure the latent heat of the melting/freezing transitions. A convenient method is by Differential Scanning Calorimetry (DSC).

As the term "thermoplastic" is used herein it defines a polymer that softens when exposed to heat and returns to its original condition when cooled to room temperature. Such a polymer can be made to soften, flow or take on new shapes, without significant degradation or alteration of the polymer's original condition, by the application of heat or heat and pressure. In contrast to a thermoplastic polymer, a "thermoset" polymer is hereby defined as a polymer that solidifies or "sets" irreversibly when cured. A determination of whether a polymer is a "thermoplastic" polymer within the meaning of the present invention can be made by slowly elevating the temperature of a stressed specimen and watching for deformation. If the polymer can be made to soften, flow, or take on a new shape, without significant degradation or alteration of the polymer's original chemical condition, then the polymer is considered to be a thermoplastic. If only small amounts of material are available it may be necessary to use a hot stage microscope for this determination.

As the term "elastomer" is used herein it defines a polymer that has the ability to be stretched to at least twice its original length and to retract rapidly to approximately its original length when released. The term "elastomeric" is intended to describe a condition whereby a polymer displays stretch and recovery properties similar to an elastomer, although not necessarily to the same degree of stretch and/or recovery.

The copolymer of the present invention is also highly biocompatible. A biocompatible material is hereby defined as a material being suited for and meeting the purpose and requirements of a medical device, used for either long or short term implants or for non-implantable applications. Long term implants are defined as items implanted for more than 30 days.

The thermoplastic copolymer of tetrafluoroethylene and perfluoromethyl vinyl ether of the present invention, can by incorporated into, or formed into, a wide variety of devices, particularly into medical devices. A medical device is hereby defined as an instrument, apparatus, implement, machine, contrivance, implant, or other similar or related article, including any component, part, or accessory, which is used in the cure, mitigation, treatment, or prevention of disease, in man or other animals, or intended to affect the structure or any function of the body of man or other animals.

The material of the present invention can be formed or incorporated into laminates. A laminate is defined as a multilayered device wherein at least two material layers are at least partially affixed together. The material layers can include the same, similar or different materials.

Microemulsion polymerization enables preparation of stable, monodispersed colloidal dispersions containing particles that are smaller than particles produced with classical emulsion polymerization processes.

In the preferred formulation of the present invention, an aqueous seeded microemulsion polymerization procedure is used to manufacture the material of the present invention in which colloidal copolymer particles are produced from tetrafluoroethylene and PMVE monomers.

The aqueous seeded microemulsion polymerization procedure involves the following steps:

(1) a microemulsion of polymerizable unsaturated liquid PMVE monomer in water is formed as the seed;

(2) tetrafluoroethylene (TFE) gaseous monomers are introduced to the microemulsion system from gas phase;

(3) the seeded monomeric microemulsion is free radical polymerized by charging free radical initiator to start the polymerization reaction.

The tetrafluoroethylene and PMVE monomers participate in the polymerization and produce small particles of polymers.

The PMVE polymerizable liquid monomer used in step (1) forms an oil-in-water microemulsion at the polymerization temperature, which can be between 0 and 150° C., preferably 40 and 100° C. The microemulsion of the polymerizable liquid monomer has an average particle size in the range of 1 to 100 nanometer (0.001 to 0.1 micrometer), preferably 1 to 80 nanometers (0.001 to 0.08 micrometer), and most preferably 1-50 nanometers (0.001-0.50 micrometers).

In step (3), when the TFE gaseous monomer and PMVE are polymerized, the final particles generally contain random copolymers.

The amounts of ingredients employed generally are 0.1-40 weight percent, preferably 0.1-20, of the monomers; 0.1-40 weight percent, preferably 0.1-25, of the surfactant; with the remainder water.

To initiate polymerization of the seeded microemulsions described above, the temperature of the monomeric microemulsion is adjusted to between 0 and 150° C., preferably 40 to 100° C. Initiators can be water soluble or oil soluble free radical initiators, such as persulfates, azo initiators, peroxides, or photo initiators which can generate free radicals by ultraviolet or gamma ray activation. Amount of initiators present can range from 0.01 to 20 percent by weight based on the liquid monomer content. Co-solvents such as an alcohol, amines or other amphiphilic molecules, or salt can be employed if desired to facilitate formation of the microemulsion. Introduction of initiators cause the polymerization of monomers to begin.

Sufficient mixing between liquid and gaseous phases should occur to encourage mass transfer. The polymerization temperature can range from 0 to 150° C. and preferably 40 to 100° C. The polymerization is carried out in a pressure vessel and polymerization pressures can range from 200 to 200,000 KPa and preferably 200 to 20,000 KPa. The polymerization proceeds for 1-500 minutes or until at least 50% of the liquid monomers are converted to polymer. The amount of gaseous monomer used can be measured by measuring the pressure in the reactor.

The resulting polymer particle latex has an average particle size of between 1 to 100 nanometers (0.001-0.10 micrometers), preferably 1 to 80 nanometers (0.001-0.08 micrometers), most preferably 1 to 50 nanometers (0.001-0.05 micrometers), and a polymer average molecular weight of over 10,000, preferably over 50,000. The small particle size provides a polymer system with a number of advantages over systems containing larger particles. The system is a colloidal dispersion and is usually clear rather than turbid. The small particle size aids in producing coatings of uniform thickness and maintains good gas permeability of porous substrates. The fluorinated monomer units in the polymer chain aids in increasing the thermal stability, hydrophobicity and oleophobicity of the substrates to which the polymer is applied.

In greater detail, the process steps include vacuuming and purging a pressure reaction vessel with TFE gas to remove oxygen; followed by:

a) combining in the pressure reaction vessel a liquid PMVE with a surfactant in water, at a temperature and ratio of monomer to surfactant sufficient to spontaneously form a microemulsion (usually indicated by the aqueous mixture becoming transparent or translucent), b) charging gaseous TFE monomer to the reactor, and c) initiating reaction of monomers by addition of a free radical initiator to the reactor.

The seeded monomeric microemulsions are prepared by mixing water, liquid PMVE monomer, surfactants, and optionally co-solvents or inorganic salts. In order for the microemulsion to form with monomer in it, the monomer must be in liquid form. When the ingredients and amounts are selected for certain operating temperatures, the microemulsion forms spontaneously. The surfactant can be any organic surfactant, but preferable is a fluorinated anionic surfactant (e.g., a salt of fluorinated carboxylic acids, fluorinated sulfuric acids, fluorinated sulfates, fluorinated ammonium salts, fluorinated non-ionic surfactants, and the like). The ratio of surfactants to other monomers present will usually be 0.5 to 6 or more (by weight).

The TFE monomer and PMVE monomer are used in amounts in the polymerization such that the polymer produced contains 20 to 60% by weight of tetrafluoroethylene and complementally 80 to 40% by weight of perfluoromethyl vinyl ether, determined by NMR or IR (infrared). Preferably these weight percents will be 40 to 70% PMVE and 60 to 30% TFE. At these weight percent ranges the copolymer will be amorphous.

Figure 1:
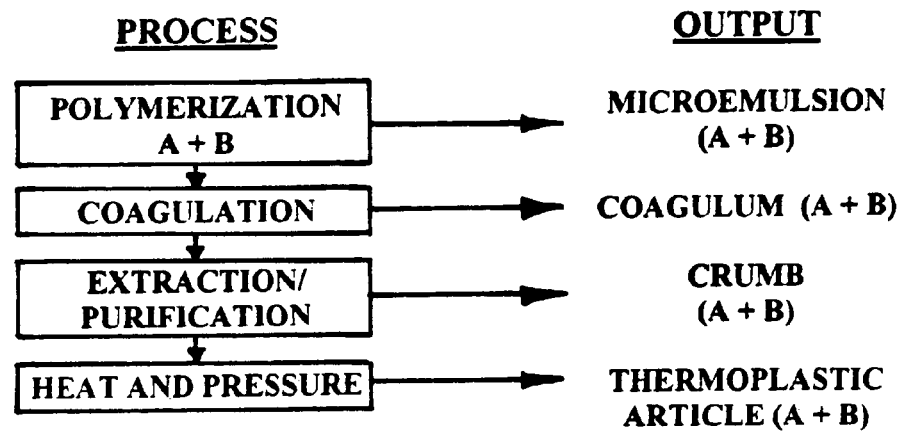
FIG. 1 describes a process flow depicting a preferred process of manufacture for the copolymer of the present invention.

Further, to enhance the purity of the copolymer as shown by the flow chart of FIG. 1, this colloidal dispersion is then formed into a coagulum and extracted. The formation of the coagulum involves the following steps:

1) Weighing and filtering the colloidal dispersion or microemulsion to remove gross particulates.

2) Pouring the dispersion into a mixing vessel.

3) Mechanically agitating the dispersion while optionally adding $HNO_3$, or an electrolyte such as ammonium carbonate, until the mixture forms lumps of coagulum material. Alternatively, freezing methods can also be used to form the coagulum material.
4) Pouring out the effluent, adding deionized water and lightly dispersing the coagulated lumps by further agitation.
5) Filtering the coagulation while adding deionized water and stirring the coagulum, by use of a filtration funnel, to obtain coagulum.
6) Draining the remaining deionized water so the coagulum can be dried.

The formed coagulum is then extracted by the following steps:
1) Transferring the coagulum into a thimble.
2) Filling an extraction column flask with methanol (MeOH) or optionally other types of alcohols such as ethanol or isopropyl alcohol or other types of organic solvents such as ketones or ethers, adding boiling stones and connecting the flask to a soxhlet extraction apparatus.
3) Placing the thimble and coagulum into the soxhlet apparatus and fitting a condenser onto the extractor.
4) Heating the flask filled with MeOH at a temperature from 20 to 100° C.
5) Letting the extraction run for approximately between 12 and 24 hours.
6) Draining the residual MeOH and refilling the flask with clean MeOH.
7) Letting the extraction run for approximately between 24 and 48 hours.
8) Heating the extraction content in a vacuum oven at 5 to 80° C., preferably at 60° C., 1 to 70 cm Hg, preferably at 45 cm Hg for approximately 0.5 to 24 hours, preferably 12 hours.

Alternatively, the extraction process can run for 48 hrs without replacement of MeOH after 24 hrs.

A preferred method of processing the noncross-linkable thermoplastic copolymer material of the present invention is depicted by the flowchart in FIG. 1. The polymerization of the two monomers, tetrafluoroethylene (TFE) and perfluoromethyl vinyl ether (PMVE) is accomplished by the microemulsion process as previously described. The resulting microemulsion has the two monomers TFE and PMVE, referred to generically as "A & B" in FIG. 1. After the coagulation process, a coagulum is formed containing the copolymer of monomers "A & B." Next the coagulum is purified by an extraction process, resulting in a crumb containing copolymer of monomers "A & B." Finally, by the application of heat and pressure the crumb is formed into a thermoplastic article, containing only copolymer of "A & B," rendering the polymer noncross-linkable.

Figure 2:
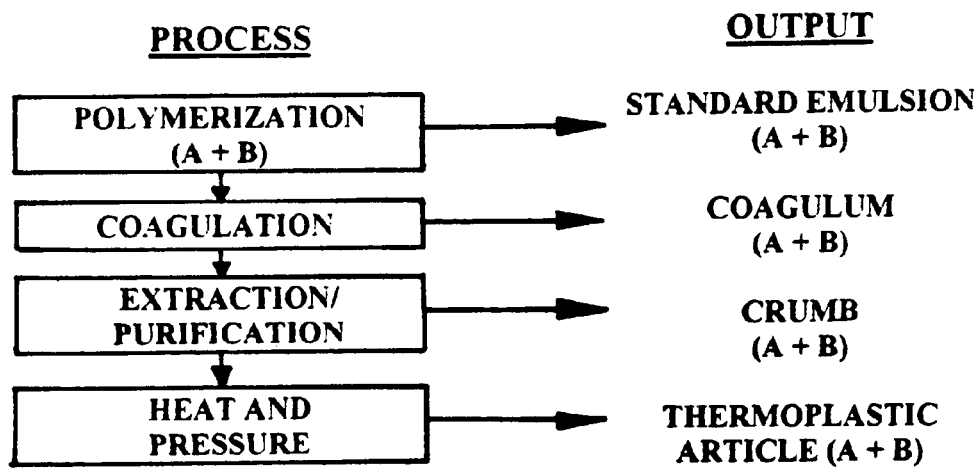
FIG. 2 describes an alternate process of manufacture for the copolymer of the present invention.

FIG. 2 presents an alternate process flow similar to the one shown in FIG. 1, with the exception of the initial polymerization step. In this alternate process flow, the material of the present invention is processed starting with a non-microemulsion or standard, conventional emulsion. However, it is preferred that the microemulsion polymerization process disclosed above is used.

Figure 3:
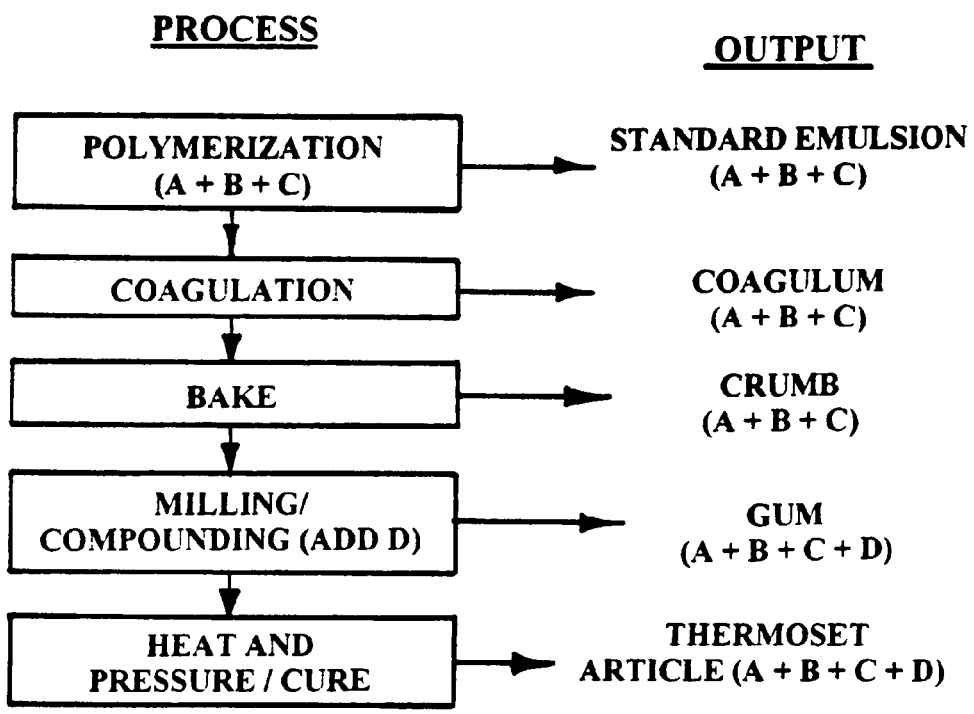
FIG. 3 describes a conventional process for the manufacture of typical thermoset articles.

FIG. 3 is a flow chart detailing prior art process steps conventionally followed. Since all known commercial polymers of TFE and PMVE are thermoset or cross-linked systems, a third monomer, generically referred to as "C" is polymerized along with the monomers "A & B." This third monomer "C" provides a subsequent site for cross-linking. After coagulation and drying, the resultant crumbs are milled or compounded, during which time a fourth, or cross-linking, agent "D" is added. The subsequent application of heat and pressure completes the cross-linking or curing, resulting in a thermoset article having the four components "A & B & C & D."

The processes described in FIGS. 1 and 2 have distinct advantages when compared to the conventional process described in FIG. 3. By only polymerizing and coagulating "A & B," as shown in FIG. 1 or 2, the resultant coagulum is easily and readily purified, for example by a simple extraction process. Conventional methods, as shown in FIG. 3, have a third monomer "C," which is incorporated during polymerization. The conventional process shown in FIG. 3 also has a milling/compounding step, necessary for the addition of the cross-linking agent "D." This compounding process is designed to shear the polymer, which breaks the polymer chain into shorter segments and uniformly distributes additives throughout the bulk of the polymer. Through compounding, the cross-linking agent "D" is placed in close proximity to the cross-linking sites, found in "C." This repeated shearing of the polymer by milling is known to reduce the tensile strength of the final material.

The mechanical and physical properties of the copolymers of the present invention have been investigated over the composition range of approximately 40 to 70 weight percent PMVE. Within that range, the following relationships have been observed.

1. The tensile strength of compression molded sheets tends to decrease with increasing % PMVE. The exact relationship is difficult to determine at this time because strength is also highly dependent on molecular weight, and all of the methods currently available for estimating molecular weight (intrinsic viscosity and melt zero shear viscosity) are also dependent on composition.

2. The secant modulus at 100% elongation for the copolymer has been shown to be a strong function of composition, with values of Es ranging from approximately 9 MPa for 44 wt % PMVE units in the polymer down to approximately 1.5 MPa for 70 wt % PMVE units in the polymer. Secant modulus does not appear to be strongly affected by molecular weight for materials tested to date.

3. The ability of the copolymer to recover after being held in a strained state is also a strong function of composition. Values of tensile set after 10 minutes of being held at 100% elongation ranged from <1% for high 70% PMVE units in the polymer to approximately 100% for 53 wt % PMVE polymer. Tensile set is also a function of molecular weight, with increasing molecular weight giving lower values of tensile set, but the effect is small in comparison to changes in composition.

4. The density of the copolymer is insensitive to composition over the range of 40 to 70 wt % PMVE. Copolymers of the present invention in a nonporous form have typical bulk densities of approximately 2.13±0.02 g/cc.

5. The refractive index of the copolymer is also insensitive to changes in composition.

6. The hardness (that is, durometer measurement) of the copolymer is sensitive to changes in composition.

With respect to the hardness, generally hardness of a non-foamed embodiment will be greater than about 30 Shore A; still lower values may also be possible. Depending upon composition, hardness measurements of non-foamed embodiments may comprise greater than about: 35 Shore, 40 Shore, 45 Shore, 50 Shore, 55 Shore, 60 Shore, 65 Shore, 70 Shore, 75 Shore, 80 Shore, 85 Shore, and 90 Shore. Specific forms of the present invention have been produced with a hardness measurement of about 85 Shore±5 Shore.

Test Procedures

A number of tests are used to define various properties of the material of the present invention. These tests are described below. Note that while GC, NMR and FTIR are described below for consideration of, for example, purity and polymer identification, additionally, ESCA (Electron Spectroscopy for Chemical Analysis), XPS (X-Ray Photoelectron Spectroscopy) and/or SIMS (Secondary Ion Mass Spectroscopy) can also be used as well as GC, NMR and FTIR (or any other method conventionally used for polymer analysis) to identify the presence or lack thereof of cross-linking monomers and/or curing agents.

Particle Size Determination

A COULTER N4MD particle size analyzer is used. The mean diameter is measured using a light scattering method with helium laser at scattering angles of 90 degrees. Each aqueous dispersion sample is diluted about 10,000 times with deionized water before measurement.

Durometer

The hardness of samples can be determined through durometer measurements. Samples are measured at room temperature (about 23° C.) by the method of ASTM D2240-91 using a Shore Durometer Type 0 with a Shore model CV-71200 Conveloader (Shore Instrument Co., Freeport, N.Y.). The durometer uses a hemispherical indenter of 1.2 mm radius. Samples tested by this method should be at least 6 mm thick. Two or more samples may be stacked if necessary to achieve the minimum 6 mm thickness. Five durometer readings should be taken at five different points on each sample; these five readings are then averaged with the resulting mean value taken as the representative hardness value of the sample. Thickness measurements are the average of three or more measurements with a set of measuring calipers.

Matrix Tensile Strength

Tensile strength is determined using conventional measurement techniques employing an MTI Phoenix universal test machine as described below. If a porous material is evaluated to determine tensile strength, the true cross sectional area of the sample must be taken into account by calculating the matrix tensile strength. Matrix tensile strength is calculated by multiplying the measured ultimate tensile strength by a density ratio. The density ratio is the density of the copolymer (the density of the copolymer has a density of about 2.13 g/cc) divided by the bulk density of the (porous) sample. For nonporous materials, tensile strength and matrix tensile strength are equivalent.

Purity Test

One of the possible impurities in the resulting resin is ammonium perfluoro octanoate (APFO), which is the surfactant used during the emulsion copolymerization of the perfluoroelastomer. Chromatography techniques such as gas chromatography (GC) can be utilized to detect trace amounts of APFO that may still be present after the exhaustive extraction process. Since APFO is a very polar compound, it adsorbs to the GC column and gives a very broad and indistinguishable peak; thus, it cannot be directly quantified. In order to measure APFO, either a fluorinated (polar) column is used or the APFO is converted to its less polar derivative. The latter method is more preferred. Equation 1 (below) shows the methanolic/HCl derivitization reaction of APFO in which APFO is converted into its methylester form (MPFO).

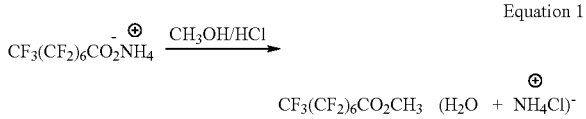

Equation 1

This derivative is less polar and more suitable for undergoing analysis by GC-ECD. Electron Capture Detector (ECD) is used to substantially increase the sensitivity of the analysis.

The purity of the copolymer (that is, resin or sheet) can be determined by the following preferred procedure:
1) Ultrasonically mix 1-2 g of the material in 10-20 ml of an appropriate extraction solvent (i.e., a solvent that dissolves the analyte but not the matrix, such as MeOH) for 7-8 hrs at 60° C. (10-fold dilution).
2) Filter the material and use the effluent for the following steps.
3) Place 2 ml of the effluent (extract) in a reaction flask. Make 3 repeats of each extract, and also use 2 ml of the extraction solvent as the negative control.
4) Add 10 ml of 3N methanolic/HCl to each flask.
5) Cap and heat the flasks in a water bath at about 60° C. for 2 hrs.
6) Add 6 ml of n-hexane to each flask followed by 20 ml of NaCl solution (18%, 18 g NaCl in 100 ml of distilled water).
7) Shake the flasks vigorously and after the mixture settles remove the organic (hexane) layer, and store it for GC-ECD analysis. Note that the possible impurity concentration in each flask represents a 30-fold dilution of its original concentration in the sample.
8) Analyze the samples by GC using the following parameters:
Column: HP-5 MS (cross-linked, 5% phenyl methyl siloxane, 25 m length×0.25 mm ID×0.25 μm film thickness)
Ramp 1: 35° C. (5 min)-10° C./min-130° C. (1 min)
Ramp 2: 20° C./min-280° C. (5 min)
Injection Temp.: 240° C.
Detector Temp.: 300° C.
Injection Volume: 1 μl
Flow: 1 ml/min Direct Injection
Blank: Hexane
Run Time: 28 min
9) The concentration of APFO in the samples is then determined by comparing the area under the peak of the methylated APFO, in their respective GC traces, to the calibration curve constructed from a series of standard or known MPFO solutions.

Resins produced from the preferred process as previously described and tested by the preferred purity test have exhibited purity levels as low as below one part per million by weight. The preferred extraction process, when continued for extended times or simply repeated additional times, or by additional purifying steps have resulted in improved purities, as low numerically as thirty parts per billion, which is the detection threshold of the equipment used in the preferred purity test. Thus the actual purity levels may be numerically below this thirty part per billion level. More particularly, purity levels are attainable that may be below about 50 parts per million (ppm), 40 ppm, 30 ppm, 20 ppm, 10 ppm, 5 ppm, 3 ppm, 2 ppm, 1 ppm, 500 parts per billion (ppb), 300 ppb, 200 ppb, 100 ppb, 50 ppb and 30 ppb. If measurement accuracy and sample sizes permit, purity levels can be variously considered to be below 50 parts per million, 40 ppm, 30 ppm, 20 ppm, 10 ppm, 5 ppm, 3 ppm, 2 ppm, 1 ppm, 500 parts per billion, 300 ppb, 200 ppb, 100 ppb, 50 ppb and 30 ppb.

Tensile Test

The tensile properties of a noncross-linkable sample of the inventive copolymer prepared in the form of a compression molded sheet and two similar commercially available elastomeric materials were determined according to ASTM standard D638-94B using the type V dogbone sample. Eight to ten samples of each type were tested. Tests were conducted on an MTI Phoenix universal test machine equipped with an Instron® model 2603-080 long travel extensometer for strain measurement. The samples were held with Instron® model 2712-003 pneumatic grips with hard rubber faces (Instron® #2702-015). After attaching the extensometer to the narrow portion of the dogbone, the sample was pulled to failure at a constant cross head speed of 100 mm/min, corresponding to an initial strain rate of approximately 650%/minute based on extensometer measurements. Values for maximum stress, strain at break and 100% secant modulus were calculated according to the ASTM standard using MTI Phoenix automated analysis software. For calculations of stress and modulus, the thickness of each sample was measured using a Starrett snap gauge (0.002 mm resolution). All materials tested were between 0.2 and 0.3 mm thick. Test data are presented in Table 1 in comparison to silicone and fluoroelastomer sheets. Sheets of Nusil platinum cured medical grade silicone rubber of 0.25 mm thickness were fabricated by Specialty Silicone Fabricators, Inc. of Paso Robles, Calif. Daiel T530 is a fluoroelastomer sheet made by Daikin Industries Ltd., Osaka, Japan.

Tensile strengths which may be achieved with the copolymer of the present invention include matrix tensile strengths of about: 5, 7, 10, 15, 20, 35, 50, 70, 85, 90, 95 MPa and above.

It is apparent that the copolymer of this invention has unexpected superior tensile strength in comparison to the commercial products.

Copolymer Identification (NMR)

The TFE and PMVE copolymer of the present invention can be identified by numerous conventional analytical means, for example by Fourier Transform Infrared (FTIR) Spectroscopy, or by Nuclear Magnetic Resonance (NMR) Spectroscopy. These example test methods, or other methods, can be used to identify the primary copolymer composition (TFE and PMVE) of the present invention. Samples of the present invention have been analyzed using Magic Angle Spinning (MAS) NMR Spectroscopy by Gleason Labs, Cambridge, Mass. Following are details relating to the specific test method used by Gleason Labs and typical results of such analysis.

1. Equipment

The equipment used is summarized in Table 2.

TABLE 2

Equipment required for NMR spectroscopy.

| Equipment | Characteristics |
|---|---|
| Chemagnetics 270 MHz Double Resonance Solids Probe | Serial no. PRB 270-395/6274 |
| 3.2 mm MAS spinning module | Made of Vespel |
| X channel | Observe nuclei ranging from $^{15}N$, $^{13}C$, $^{29}Si$ to $^{31}P$ |
| H channel | Observe nuclei $^{19}F$ and $^{1}H$ |
| Operating temperature | −150 to +250° C. |
| Fiberoptic spin sensor | |
| Chemagnetics 3.2 mm Rotor Parts | |
| Sleeve | Made of zirconia (part no. SPA005-003) |
| Drive tip | Made of Torlon (part no. SPA005-038) |
| Bottom spacer | Made of Vespel (part no. SPA006-051) |
| End cap | Made of Vespel (part no. SPA006-051) |
| Chemagnetics Smart Speed Controller | Serial no. ACC000-007/058 |
| Chemagentics VT Stack | Serial no. ACC000-003/220 |
| Tecmag Libra F-12 Data Acquisition Unit | Serial no. M941222 |
| Power supply | Serial no. MP941223 |
| Two-channel A/D board | Digitization rate of up to 10 MHz (100 ns) |
| MacNMR PPC software | Remote acquisition and data analysis |
| 6.3 T (270 MHz) Oxford Superconducting Magnet | 89 mm diameter wide bore |
| JEOL room temperature shim unit | |

2. Sample Packing.

The sample rotor consists of a sleeve, drive tip, bottom spacer, and end cap. The sample is positioned at the center of the rotor and represents a volume of 11 mm$^3$. To pack the rotor, the drive tip and bottom spacer are first assembled onto the sleeve. Packing the sample then requires the use of a sample packing tool which has a marking to indicate the maximum level of filling that can be accommodated. The remainder of the volume in the sleeve is then occupied by inserting the end cap. Powdered samples are packed directly, while film samples have to be cut or crushed to the correct dimensions before inserting into the sleeve. Several sequential steps of filling and packing were performed to reach the maximum filling level. This ensured tighter packing and greater sample quantity, thus improving NMR detection sensitivity. Typically, sample weights of between 10-30 mg are achieved.

TABLE 1

Tensile properties.

| Property | Values for inventive copolymer sample, +/−std dev | Silicone-Nusil MED4065 | Daiel T530 |
|---|---|---|---|
| Tensile Strength - MPa | 65.0 +/− 13.3 | 8.78 +/− 0.7 | 52.0 +/− 8.7 |
| Elongation at Break - % | 251 +/− 34 | 928 +/− 22.7 | 614 +/− 160 |
| 100% Secant Modulus - MPa | 7.0 +/− 0.30 | 3.05 +/− 0.05 | 3.0 +/− 0.5 |

Powder free gloves are used to prevent extraneous contamination during packing. Suitable face masks are worn when appropriate to prevent inhalation of airborne particulates. This is especially important for films which needs to be scraped off from a substrate before packing, since scraping may cause a substantial amount of particles to become airborne.

3. NMR Data Acquisition.

Acquisition is performed on a spectrometer using a Tecmag Libra data acquisition unit and a 6.3 Tesla Oxford superconducting magnet. Correspondingly, Larmor frequency of $^{19}F$ nucleus is 254.0 MHz. To achieve high spectral resolution, a Chemagnetics double resonance solids probe capable of up to 25 kHz magic angle spinning is used to spin the sample rotor. Sample spinning is achieved by passing bearing and drive gas around the rotor which is placed inside the spinning module of the probe. The drive gas is used to introduce rotational motion via contact with the drive tip while the bearing gas is used to stabilize the spinning rotor. A Chemagnetics speed controller maintained speed to within ±3 Hz of setpoint. Nitrogen gas is used as both the bearing and drive gas to minimize probe contamination and to ensure spinning stability.

Typical acquisition parameters are given in Table 3. Total acquisition time for each one dimensional spectrum varies with sample relaxation characteristics, number of signal averages and the desired signal-to-noise ratio but normally is in the range of 10 to 30 min.

TABLE 3

Typical NMR acquisition parameters.

| Parameter | Typical Value |
|---|---|
| Pulse length (90°) | 1.25 ms |
| Pulse power | 100 W |
| Spectral filter window | ±100 kHz |
| Acquisition digitization rate | 5 ms |
| Number of signal averages | 128 |
| Number of acquisition points | 4096 |
| Time between each signal average | 10 s |
| Zero fill before Fourier transform | x1 (8192 pts) |
| Line broadening | none |

4. Variable Temperature Setup.

Variable temperature ("VT") studies between −150 to +250° C. can be done. This is achieved by introducing heated nitrogen gas across the rotor area during spinning. This nitrogen gas is a separate VT gas and is heated by a resistive heater within the VT stack above the probe. A thermocouple together with a temperature controller enabled gas inlet temperature to be controlled. Gas pressure required is not high, only about 5 psig. The equipment and procedure listed above was replicated from a Gleason Lab Standard Operating Procedure titled:

High Resolution Solid State 19F MAS NMR Spectroscopy.

Revised: 2.27.98 Gleason Lab, MIT.

Gleason Lab, Cambridge, Mass.

Figure 4A:
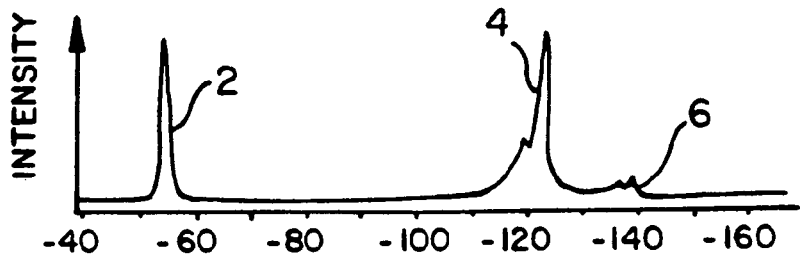
FIGS. 4A through 4F show typical NMR profiles or signatures for the copolymer of the present invention. Shown are various profiles for random samples of the copolymer of the present invention in normal and high resolutions.

Typical results from the above analysis are shown in FIGS. 4A-4F. Shown in FIG. 4A is a NMR/MAS plot of "Intensity" vs. "ppm", derived from the analysis of the material of the present invention. The indication of, or signatures of, three primary molecules are depicted by the three intensity spikes 2, 4, and 6. Typical intensity spike 2, occurring at approximately −55 ppm indicates the presence of the $OCF_3$ molecule. The typical spikes 4, centered at approximately −123 ppm, indicate the presence of the $CF_2$ molecule. The typical spikes 6, centered at approximately −138 ppm indicate the presence of the CF molecule. The three spikes 2, 4, 6 comprise a typical NMR/MAS signature of the noncross-linkable copolymer (TFE and PMVE) of the present invention.

Figure 4B:
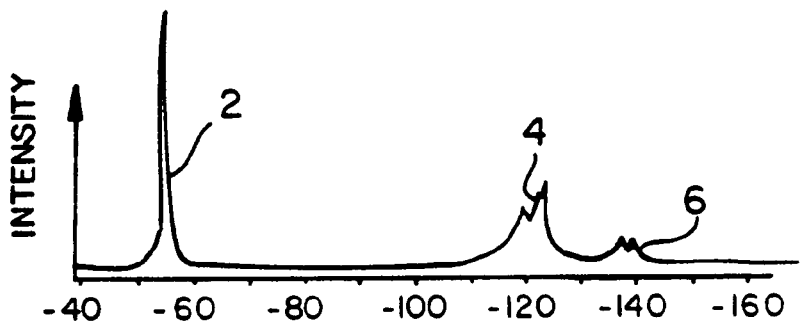
Figure 4C:
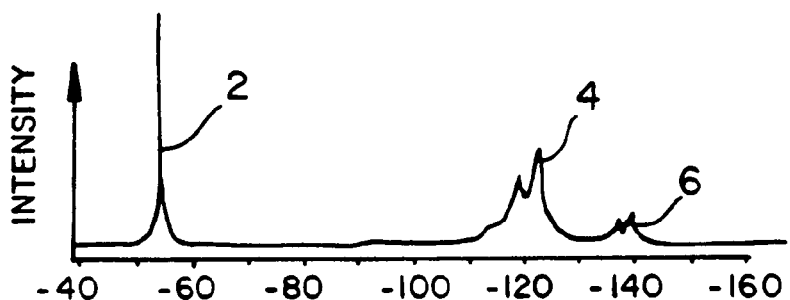
Figure 4D:
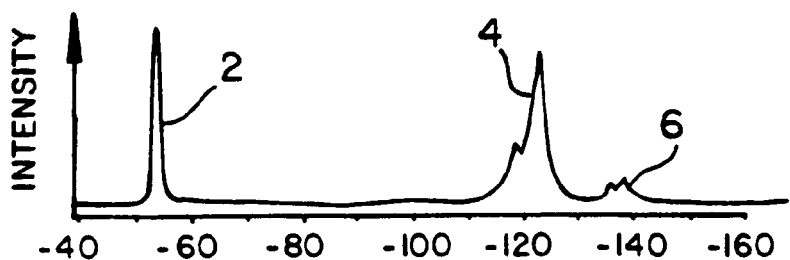

Similarly, FIGS. 4B through 4D show NMR/MAS plots of "Intensity" vs. "ppm", for various random samples of the material of the present invention. Similar intensity spikes 2, 4, and 6, occur at approximately the same ppm as in FIG. 4A, indicating the presence of $OCF_3$, $CF_2$ and CF molecules. The three combined spikes 2, 4, and 6, is a signature of the two monomers, TFE and PMVE of the present invention. As shown in FIGS. 4A through 4D, the relative intensities of the spikes 2, 4, and 6 can vary. The signature, or indication of the presence, of the copolymer of the present invention is indicated by the location or ppm of the particular intensity spikes.

Figure 4E:
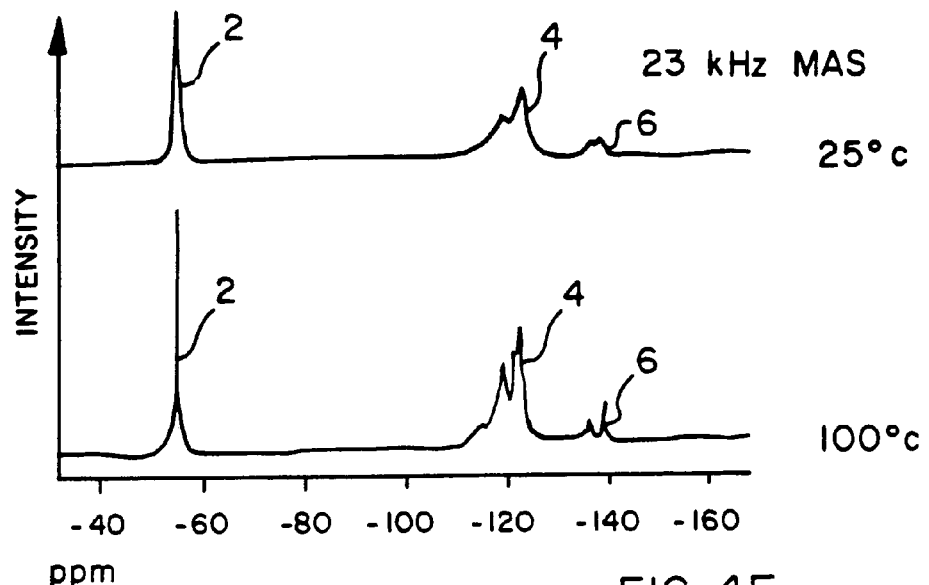
Figure 4F:
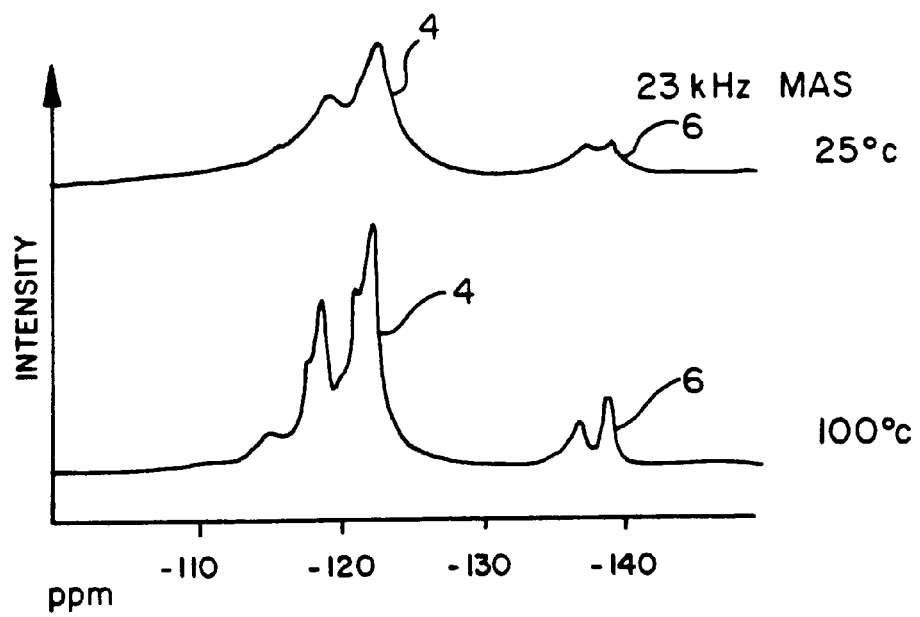

The degree of resolution regarding a spike profile can be enhanced by raising the temperature of the sample under test. The increased resolution of the signature spikes 4 and 6 is shown in FIG. 4E, which compares signatures of the present invention derived at 25 and 100° C. Similarly, the resolution of a signature spike can be enhanced by extended sequence resolution. The increased resolution of the signature spikes 4 and 6 is shown in FIG. 4F, which compares signatures of the present invention derived at 25 and 100° C., while also incorporating extended sequence resolution.

Copolymer Identification (FTIR)

The TFE and PMVE copolymer of the present invention can also be identified by Fourier Transform Infrared (FTIR) Spectroscopy. Organic compounds absorb infrared light at various wavelengths depending on the types of chemical bonds present in the molecule. An IR spectrum provides a fingerprint or signature of the organic compound which allows confirmation of the copolymer TFE and PMVE of the present invention. The spectrum is a plot of the amount of light absorbed versus the wavelength or frequency of infrared light. Samples of the present invention have been analyzed using internal Fourier Transform Infrared (FTIR) Spectroscopy. Following are details relating to the specific test method used internally along with typical results of such analysis.

The following FTIR instruments are used in the analyses.

1) Perkin Elmer Model 1600 FTIR Spectrophotometer.
2) Nicolet 510P FTIR Spectroscopy, equipped with Nicolet PC/IR software version 3.2 run on a Hewlett Packard Vectra 486/33T personal computer.

The FTIR instrument parameters are:

Scan Range: 4400 $cm^{-1}$-450 $cm^{-1}$

Resolution: 2.0 $cm^{-1}$

Apodization: Strong

Scan #: 16

Figure 5:
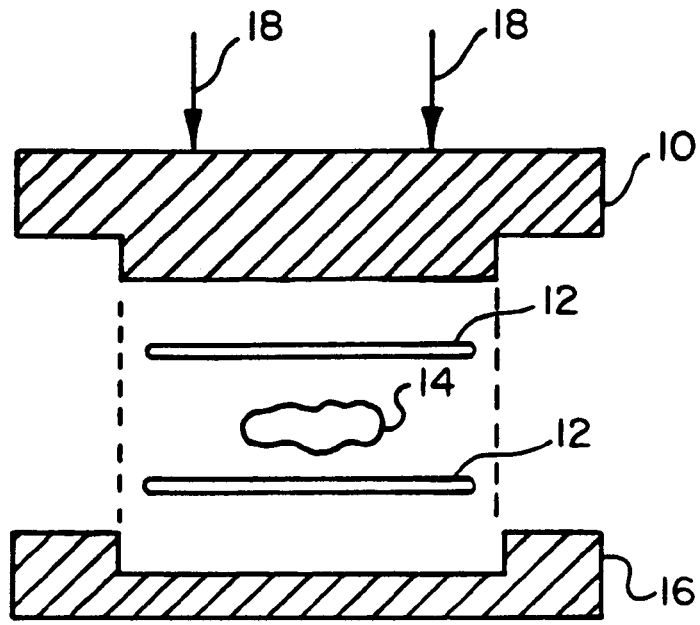
FIG. 5 shows a partial cross section of the mold used for the preparation of FTIR samples.

Samples of the copolymer of the present invention are prepared for analysis according to FIG. 5. Approximately 4 gms of the sample 14 are placed between two high temperature sheets 12. The high temperature sheets 12 and the sample 14 are then placed into a lower die 16 cavity. The upper die 10 is aligned to the lower die and placed into a heated, vacuum platen press (not shown). The die is heated to approximately 250° C. The die containing the sample is initially subjected to vacuum for approximately two minutes, compressed by applying load 18 at approximately 14 MPa for approximately 30 seconds and allowed to stabilize under vacuum for approximately 2 minutes.

FTIR Analysis
1. Latex gloves should be worn throughout the following analysis.
2. A background is scanned using FTIR parameters of 16 scans over the range of 4400-450 wavenumber (cm$^{-1}$) and the resolution of 2 wavenumbers. It takes 2 minutes for the analysis.
3. Samples of about 4 cm$^2$ are cut, the high temperature sheets are removed using a pair of forceps, and the sample layer is placed into the sample holder in the instrument's sample chamber.
4. The sample chamber is purged out for 3-4 minutes prior to the analysis.
5. The sample is then scanned using the above FTIR parameters.
6. The y-axis (absorbance) is scaled to 3.0 absorbance units, while the x-axis (wavenumber) is scaled from 450 to 3000. The baseline correction and smoothing of the FTIR spectrum are then adjusted.
7. Spectrum of a copolymer of the present invention shows two feature peaks, 2360 cm$^{-1}$ and 890 cm$^{-1}$, which are assigned to TFE and PMVE regions, respectively.
8. The absorbance height at peak of 2360 is determined over the range of 2800-2200 cm$^{-1}$, while that of 890 is calculated over the range of about 921-875 cm$^{-1}$.
9. Comments are inserted onto the spectrum, and the two peaks of interest are labeled.
10. The resulting spectrum is then plotted.
11. The following equation is utilized to calculate PMVE wt % of the copolymers.

$$PMVE \text{ wt \% of } X = \frac{R_x}{R_{ref}} \; (PMVE \text{ wt \% of Reference } IR)$$

where X=copolymer; R=(A$_{890}$/A$_{2360}$); A=absorbance. The reference material can be any copolymer of TFE and PMVE whose composition has been determined by another method, for example NMR.

Figure 6:
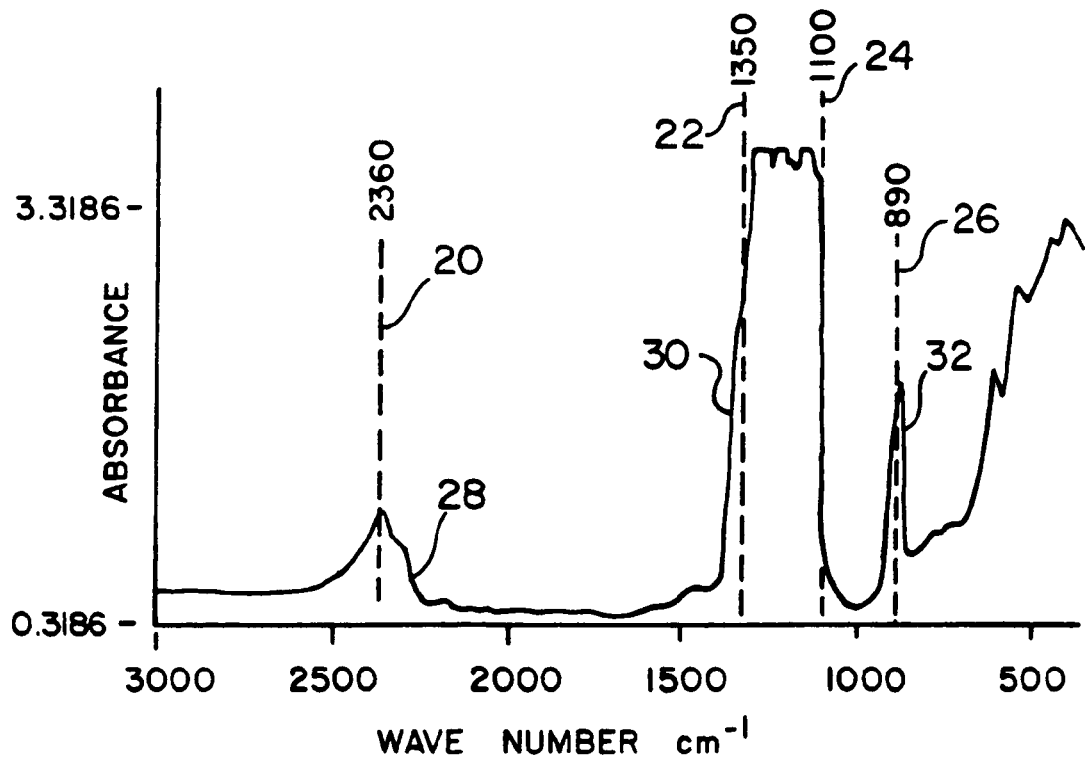
FIG. 6 shows a typical FTIR profile or signature of the copolymer of the present invention.

Typical FTIR results, derived from the analysis of samples of the present invention are shown in FIG. 6. Shown is a graph of "absorbance" vs. "wave number," typical of a FTIR analysis. As shown in FIG. 6, the copolymer of the present invention has three significant absorbance spikes 28, 30 and 32. The first absorbance spike 28 is typically centered upon the wave number datum 20, occurring at approximately 2360 cm$^{-1}$. The second absorbance spike 30 is typically centered between the wave number datums 22 and 24 occurring at approximately 1350 and 1100 cm$^{-1}$ respectively. The third absorbance spike 32 is typically centered upon the wave number datum 26, occurring at approximately 890 cm$^{-1}$.

Optical Transmittance

The optical properties of the copolymer of the present invention have been quantified by Optical Data Associates, Tucson, Ariz. Total reflectance was measured using a Cary 5E Spectrophotometer and then verified using a Metricon Prism Coupler. Following are the derived refractive indices for three random samples of the copolymer of the present invention:

|  | Spectrophotometer, 630 nm | Metricon, 633 nm |
| --- | --- | --- |
| Sample 1 | 1.341 | 1.326 |
| Sample 2 | 1.322 | 1.326 |
| Sample 3 | 1.313 | 1.330 |

Figure 7:
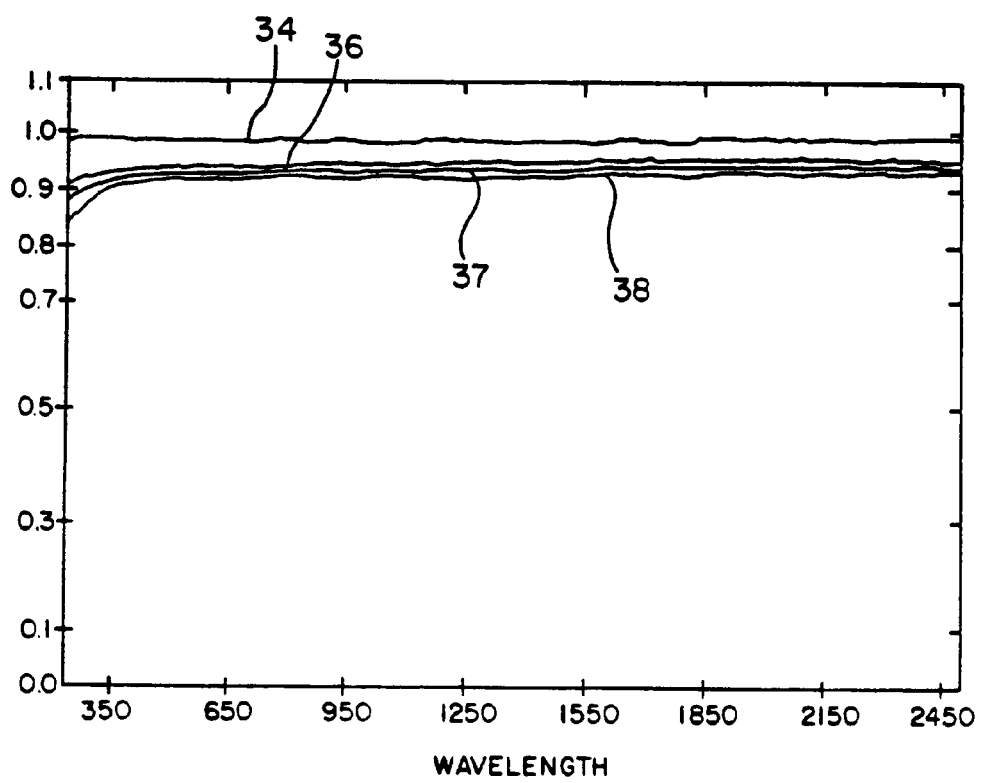
FIG. 7 shows a typical visible light transmission profile for materials of the present invention.

Shown in FIG. 7 is a derived graph of "Diffuse Transmittance" vs. "Wavelength" for the three optical test samples of the copolymer of the present invention referred to above. Shown in this Figure is the baseline 34, along with the representative transmittance values 36, 37 and 38 for the samples tested. As shown in FIG. 7, the copolymer of the present invention displays a light transmission of 90% or greater, or 94% or greater over a wide spectrum of wavelengths.

Frictional Wear

Figure 8A:
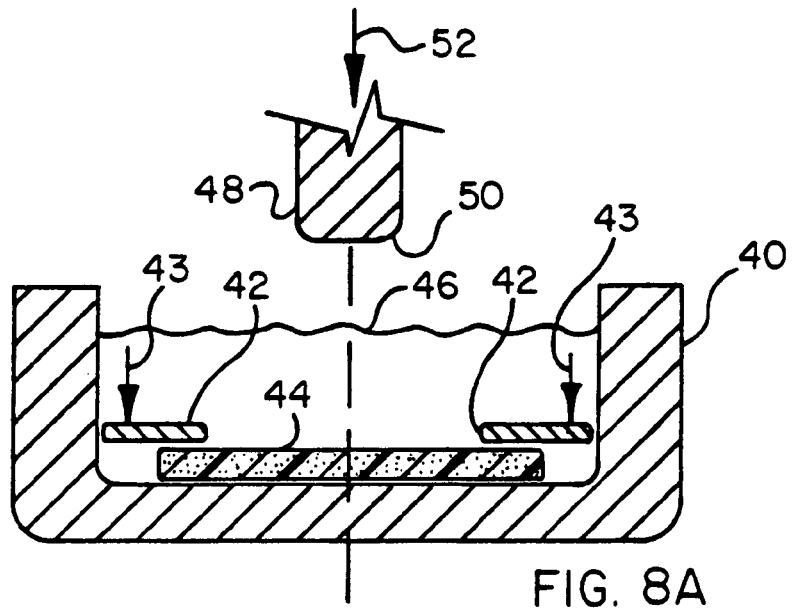
FIG. 8A shows a partial cross section of the sample fixture used in the abrasion wear test.
Figure 8B:
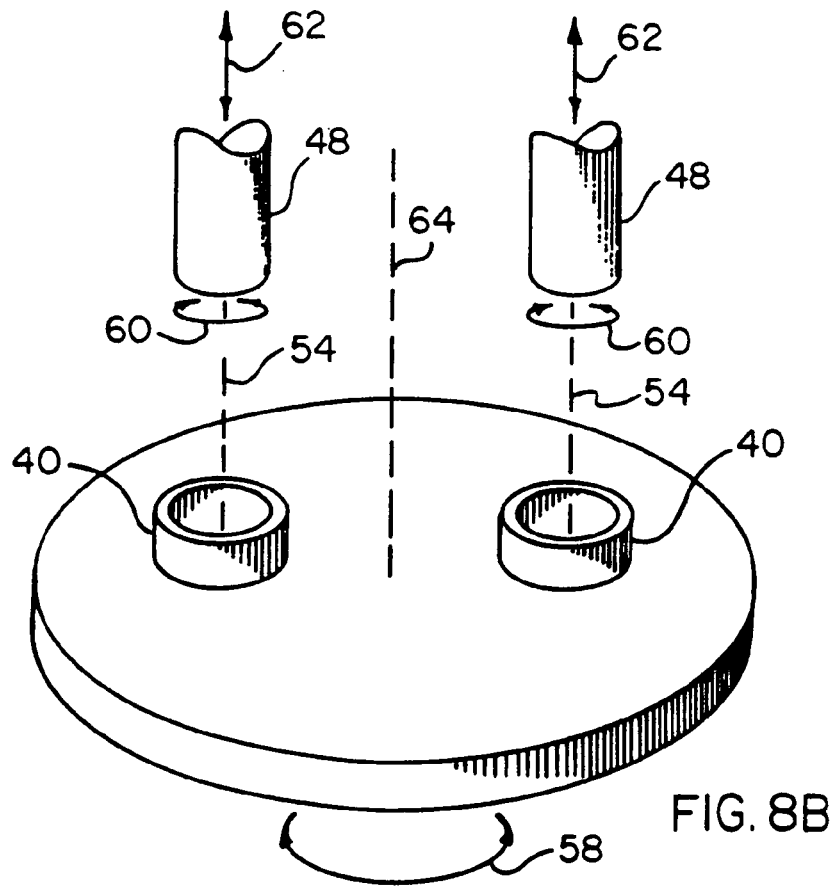
FIG. 8B shows an isometric view of the abrasion wear test equipment.

The copolymer of present invention was tested to determine the frictional wear or abrasion characteristics, using commercially available, thermoset silicone as a control comparison. Abrasion or wear resistance was evaluated using an AMTI, Advanced Mechanical Technology, Inc., Waltham, Mass., Abrasion tester, 1997-1998 model, six specimen Ortho-Pod tester. Details of this abrasion tester are shown in FIG. 8A. Shown in FIG. 8A is a cross section of a typical sample fixture 40. The test sample 44 is placed into the sample fixture 40. A ring clamp 43 is placed onto the sample 44 and secured by applying a clamping load 43. The sample fixture 40 is filled with deionized water 46. A 9 mm diameter, ceramic aluminum oxide abrasion pin 48, having a circumferential edge radius 50, is then approximately aligned to the center axis 54 of the sample fixture 40. During testing, the abrasion pin 50 is forced against the test sample 44 by applying load 52. Shown in FIG. 8B is an isometric view of the abrasion wear tester. Up to six, water filled, sample fixtures 40, containing clamped samples to be tested, are fixtured onto an oscillating base plate 56. During testing, the base plate 56 oscillates 58, about a central axis 64. Up to six abrasion pins 48 are approximately aligned to the central axis 54, of the sample fixtures 40. The individual abrasion pins 48 oscillate 60, about their central axis 54. The applied load 62 is also varied during testing. During a typical wear abrasion test, the base plate 56 oscillates at approximately 2 Hz. The angular displacement of the base plate 56 is adjusted to contain the abrasion pins 48 within the inner diameter or opening of the sample clamping rings. Typical angular displacements of the base plate 56 result in a 15 to 18 mm linear displacement of the abrasion pin relative to the test sample. The abrasion pins are rotationally oscillated, approximately ±20 degrees, at approximately 4 Hz. The abrasion pin load 62, is varied between 7±2 Kg, at a frequency of approximately 2 Hz.

Abrasion or wear characteristics are determined by subjecting the comparative material samples to a number of abrasion cycles and then measuring the sample weight loss. The percent change in sample weight is then calculated. An abrasion cycle is defined as one complete oscillation, or one full angular excursion of the base plate. Following is typical abrasion wear data comparing materials of the present invention to commercially available thermoset silicone. The silicone used for the comparison was MED-4716/PT MDX4-4516, procured from NuSil Silicone Technology, Carpinteria, Calif.

Number of Abrasion Cycles: U.S. Pat. No. 4,804,688

|  | % Weight Change |
| --- | --- |
| Present Invention 1 | 0.06 |
| Present Invention 2 | 0.12 |
| Present Invention 3 | 0.22 |

Number of Abrasion Cycles: U.S. Pat. No. 2,007,666

|  | % Weight Change |
| --- | --- |
| Silicone Sample 1 | 6.74 |
| Silicone Sample 2 | 7.40 |
| Silicone Sample 3 | 0.45 |

The comparative silicone samples abraded more rapidly than the samples of the present invention, so the testing of the silicone was terminated at a lower number of abrasion cycles.

As seen by this comparative data, the thermoplastic copolymer of the present invention exhibited approximately 85 times less abrasion wear, compared to thermoset silicone, based on weight change averages and an approximated equal number of abrasion cycles.

Tensile Set

The material of the present invention was analyzed to determine tensile set properties. Values of tensile set were determined for various samples of the present invention using the method outlined in ASTM Standard D412 in which the material is strained to a fixed value (100%) and held for 10 minutes, then released and allowed to recover for 10 minutes. The amount of permanent deformation in the sample is determined by measuring the distance between benchmarks on the narrow portion of the dogbone sample. The permanent set is then expressed as a percentage of the original length. It was discovered that materials of the present invention, with relatively high amounts of the PMVE monomer (65 to 70 wt %), possessed remarkably low average tensile set values of less than 0.9%.

Suture Hole Leakage

The elastomeric properties of the thermoplastic copolymer of the present invention are useful for a wide variety of applications. For example, elasticity can be imparted to devices imbibed or coated with the copolymer of the present invention. The elastomeric properties can also be used to at least partially seal holes, for example, suture or cannulation needle punctures. By laminating or hot melt reflowing the copolymer of the present invention onto a vascular graft or surgical patch, the perforation leakage is greatly reduced due to the elastomeric behavior of the thermoplastic material which recovers and seals at least partially the puncture.

Figure 9A:
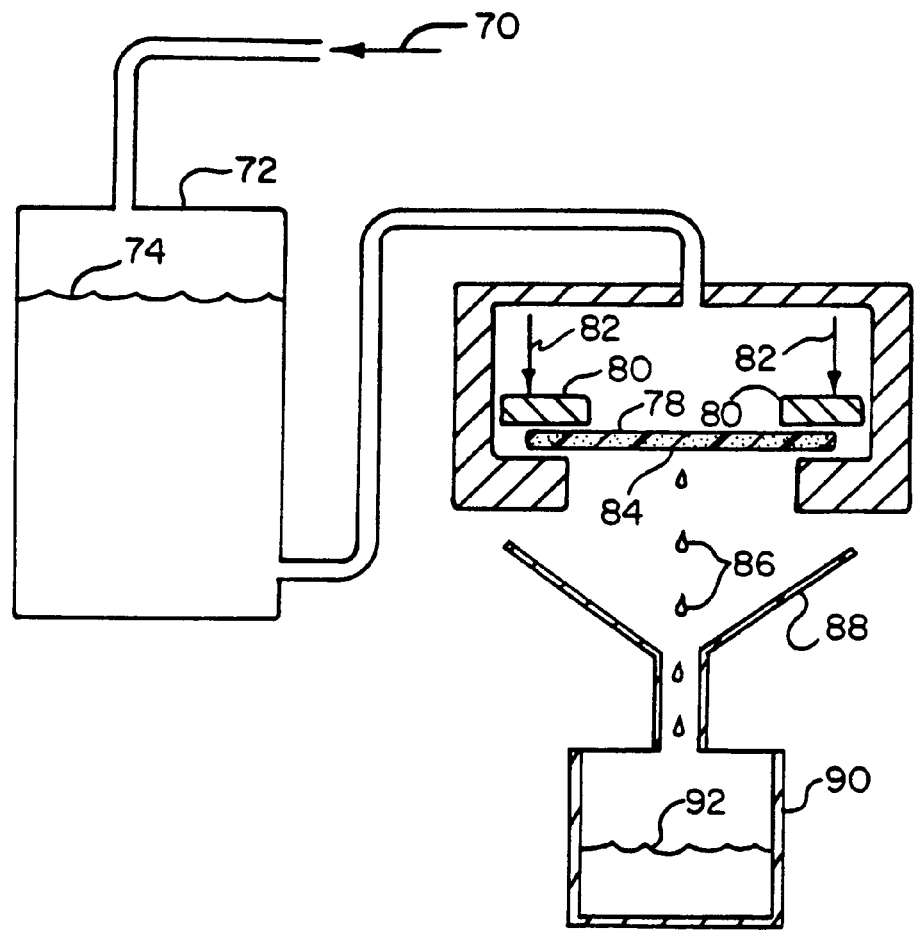
FIG. 9A shows a partial cross section of the water leak rate test equipment.

In order to evaluate and quantify the reduction in suture hole leakage, as a result of the incorporation of the material of the present invention into a vascular graft or patch, an in vitro test has been developed. This in vitro leak rate test is depicted in FIG. 9A. As shown in FIG. 9A, an air over fluid reservoir 72, containing filtered, deionized water 74 is pressurized by applying air 70 at a constant 5.9 KPa. The water is maintained at a constant 40° C. The test sample is prepared by placing through the sample a specific number of sutures having a specific pattern. The prepared sample 78, is then positioned into a leak fixture 76. The sample 78 is clamped by a clamping ring 80 which is secured by clamping load 82. The constant water pressure, delivered to the upper surface of the test sample, forces water through the openings 84, created by the pre-suturing. Water droplets 86 are captured by a collection funnel 88 and directed into a graduated cylinder 90. The volume or weight of the collected water 92, over a specific amount of time, is used to calculate a leak rate, in ml/minute. This in vitro test defines the average water leak rate for a sample prepared in accordance with the following sample preparation procedure. The leak rate of various sample materials may be determined and compared using this test. The test sample is prepared for the invitro leak test according to FIG. 9B.

Figure 9B:
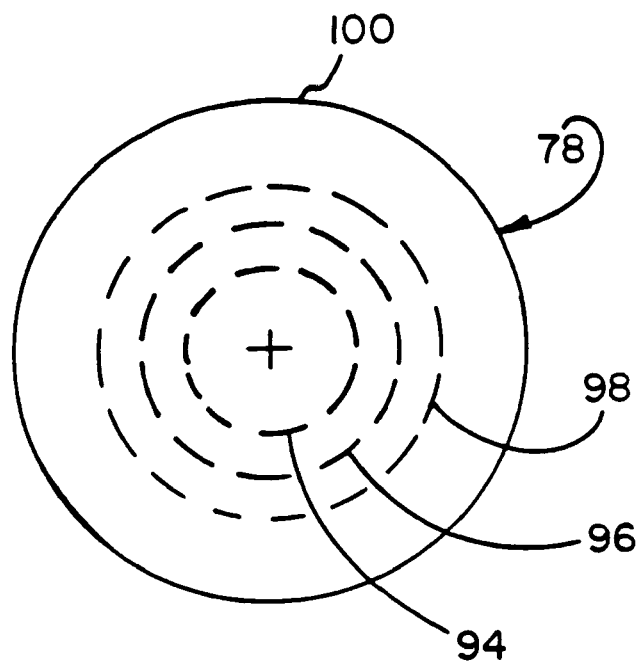
FIG. 9B shows a top view of a water leak rate test sample.
Figure 9C:
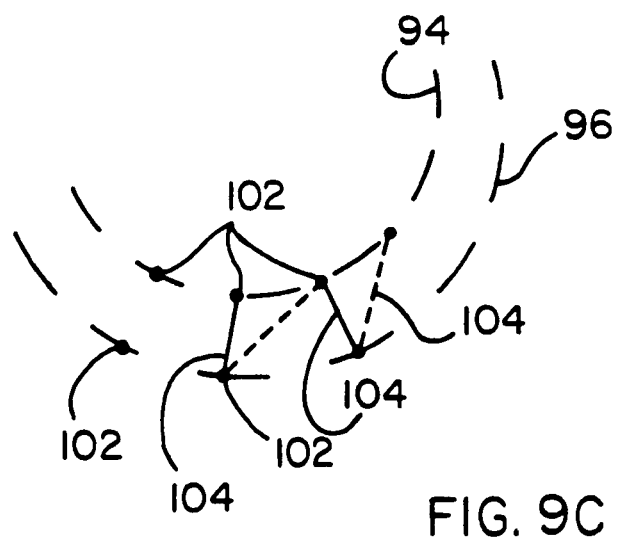
FIG. 9C shows the suturing details of the water leak rate test sample.

Shown in FIG. 9B is a top view of the test sample 78. A continuous suture pattern is placed between the two diameters 94 and 96. The sample 78 is clamped between diameters 98 and 100. The diameter 94 is approximately 2.10 cm, the diameter 96 is approximately 2.54 cm, the diameter 98 is approximately 2.80 cm and the diameter 100 is approximately 4.20 cm. As shown in FIG. 9C, a series of marks 102 are printed onto the sample. Forty marks 102 are printed, evenly spaced along each diameter 94 and 96. The marks 102 are paired or oriented in an approximate radial fashion, such that a line projected through a pair of marks crosses the approximate center of the sample. The sample is then sutured with a single 3-0 Braided Silk suture on a RB-1 needle (Ethicon Part Number K872H). Using the marks 102 as a guide, a continuous suture 104 is threaded through the sample and through a pair of marks without tension. The suture placement is continued, without tension through the sample and through all remaining marks. Upon completion of the pattern, the suture is knotted using four flat square throws.

EXAMPLES

Copolymer Preparation

Without intending to limit the scope of the present invention, the following examples illustrate how the copolymer of the present invention may be made and used.

Example 1

A 2 liter pressure vessel is subjected to vacuum and purge with TFE gas three times to reduce oxygen content to below 30 ppm. 1000 g of deionized water, 50 g of PMVE monomer, and 90 g of ammonium perfluorooctanoate surfactant (Fluorad FC-143, 3M Corp., Minneapolis, Minn.) are added. The mixture is a transparent microemulsion at 50° C. and is maintained at a stirring speed of about 1200 rpm. Then the temperature of the mixture is raised and maintained to be about 75° C., and tetrafluoroethylene gas is charged to the reactor and the pressure inside the reactor is about 1500 KPa. 0.4 g of ammonium persulfate initiator in 40 g of water is pumped into the reactor to start the reaction. Reaction proceeds for about 42 minutes and is stopped. At the end of the reaction, the pressure inside the reactor is about 200 KPa, which means that a sufficient amount of tetrafluoroethylene was used during the polymerization reaction.

Example 2

In a 10 litre stirred pressure reactor, 5.5 kg of deionized water and 150 g of Fluorad® FC143 (3M produced ammonium perfluoro octanoate) were charged, under a constant agitation speed of 900 rpm at ambient condition. Subsequently, the reactor was purged with tetrafluoroethylene gas, following with a vacuum. This was repeated three times to insure the oxygen level in water is below 30 ppm. Then, 510 grams of a liquid perfluoro methyl vinyl ether monomer ($CF_2=CFOCF_3$) was charged to the reactor under the same agitation speed. It is important to charge the monomer as a liquid in order to form a microemulsion in water. Then, 550 grams of gaseous tetrafluoroethylene monomer ($CF_2=CF_2$) was charged to the reactor. At this moment, the reactor was fully sealed and the inside temperature was raised to 70° C. under the same agitation speed. The pressure inside the reactor was recorded at 1.9 MPa. Then 5 grams of ammonium persulfate, a free radical initiator dissolved in 100 grams of deionized water, was pumped into the reactor to start the microemulsion polymerization. The reaction temperature was maintained at about 70° C. during the polymerization and the pressure inside continued to drop as polymerization proceeded. From the beginning of the initiator charge to a point where pressure inside the reactor dropped to 0.4 MPa was a total of 53 minutes. Reaction was stopped at this point by evacuating the reactor and cooling the reactor temperature to ambient condition. A total of about 7 kg of a transparent aqueous dispersion was formed, wherein the resulting copolymer solid content was about 12.4% and the number average copolymer colloidal particle size was about 33 nanometer determined by a laser light scattering technique. The composition of the obtained copolymer of (tetrafluoroethylene and perfluoro methyl vinyl ether) was determined by FTIR to be about 54% by weight of perfluoromethyl vinyl ether. The copolymer was found to have tensile properties of 61 MPa in tensile strength and 248% in tensile elongation and a density of 2.144 g/ml.

EXAMPLES

Other

The polymer so produced can be applied directly from the colloidal dispersion by immersing a substrate material into the dispersion, or by painting the substrate with the dispersion, or by spraying the dispersion onto the substrate. Suitable substrates include various porous and nonporous substrates, including fabrics, woven or non-woven materials, screens, paper, or porous or microporous membranes of any form including sheets or tubes. Once the coating is applied to the substrate, any water, surfactant or initiators remaining can be drawn off by any convenient means, such as heating, steam stripping, vacuum evaporation, or the like.

A particularly preferred porous substrate is a microporous polytetrafluoroethylene made by stretching polytetrafluoroethylene as described in U.S. Pat. Nos. 3,953,566 and 4,187,390 to Gore, incorporated by reference. In this procedure the structure comprises polymeric nodes interconnected by fibrils, the nodes and fibrils comprising a microstructure defining pores or void spaces therein.

Figure 10A:
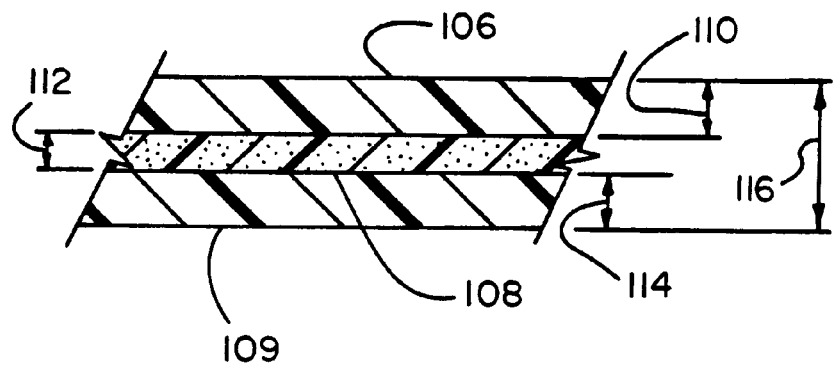
FIGS. 10A through 10E show cross sectional views of various laminate structures.

As shown in FIG. 10A cross section, a laminated structure may be formed comprising a first layer 106, a second layer of the inventive copolymer 108 and a third layer 109. The layers 106, 108, 109 have respective thickness 110, 112, 114 and the laminate has a total thickness 116. The first and third layers 106, 109 can be comprised of any materials suitable for the intended purpose of the laminated device. The first layer 106 and the third layer 109 can consist of the same, similar or different materials. For example, the material of the present invention or layer 108 may be used to simply bond the first layer 106 to the third layer 109. An example of this configuration is a hernia repair patch, wherein the first layer 106 is comprised of a material which encourages tissue attachment, while the third layer 109 is comprised of a material which discourages tissue attachment.

Another embodiment of the laminated device shown in FIG. 10A is a surgical sheet which can be used as a surgical patch, or a dura mater substitute having reduced suture hole bleeding or leakage. The elastomeric properties of the inventive copolymer cause the layer 108 to recover from being punctured. The suture hole is therefore at least partially sealed and bleeding or leakage is reduced. A low bleed surgical sheet can be formed from a 0.4 mm thick GORE-TEX® Cardiovascular Patch, available from W.L. Gore & Associates, Inc., Flagstaff, Ariz. The 0.4 mm thick patch can be slit into two approximately equal thickness of about 0.2 mm. The copolymer of the present invention is formed into a sheet, approximately 0.2 mm thick by thermo compression. Typical compressive loads are approximately 14 MPa with typical temperatures of about 250° C. The sheet of the inventive copolymer is then placed between the two layers of the patch material and the three layers are then thermo compressed to form the laminate. Typical lamination temperatures are around 200° C. with applied pressures less than 7 KPa, for approximately 7 minutes. The first layer 106 has a typical thickness 110 of about 0.2 mm, the second layer 108 has a typical thickness 112 of about 0.2 mm and the third layer 109 has a typical thickness 114 of about 0.2 mm. The resultant surgical sheet has a typical total thickness 116 of about 0.6 mm. Devices of this laminated configuration, incorporating the material of the present invention, display average leak rates of less than about 6 ml/minute, when subjected to the water leak test previously described.

Dura mater substitutes can be formed in a similar fashion. The first and third layers 106 and 109 can consist of expanded polytetrafluoroethylene (ePTFE), as previously described. Thickness 110, 112, 114 of the three layers 106, 108, 109, can be tailored to optimize handling and leak rate. The specific microstructure of the first and third layers can be varied to enhance tissue response and optical clarity. Dura mater substitutes having first and third layers about 0.1 mm thick with average microstructures of about 5 microns, incorporating a second layer about 0.2 mm thick of the inventive material, display average leak rates of less than 9.0 ml/minute, when subjected to the water leak test previously described.

Figure 10B:
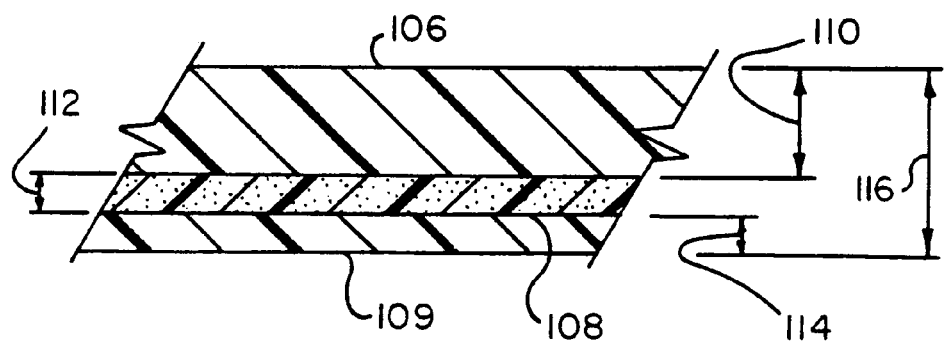

As shown in FIG. 10B, the laminated structure can have layers of different thickness 110, 114.

Figure 10C:
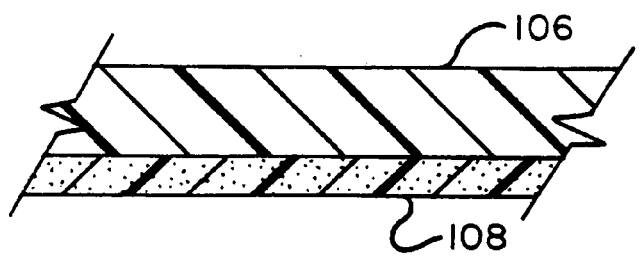

As shown in FIG. 10C the copolymer of the present invention 108 can be laminated or bonded to another material 106 by conventional thermo compression means. Laminate assemblies are not limited to two or three layers and can include 4, 5, 6, 7, 8, 9, 10 or more layers, comprising the same, similar or different alternating materials.

Figure 10D:
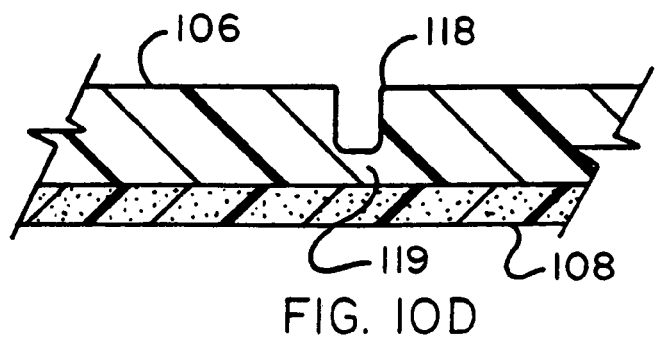

As shown in FIG. 10D, a layer 106 of a laminated device can have indents 118, for example to encourage tissue attachment or to capture or contain other materials, such as antimicrobials or other therapeutic agents. The region 119 below the indent 118 can be densified to enhance the optical clarity or light transmission, particularly in the use of dura mater substitutes.

Figure 10E:
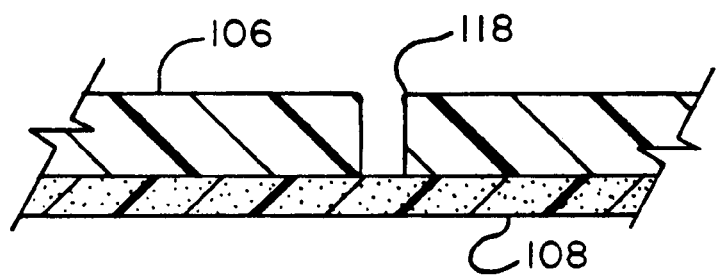

As shown in FIG. 10E, the indent 118 can penetrate the entire thickness of a layer 106.

Figure 10F:
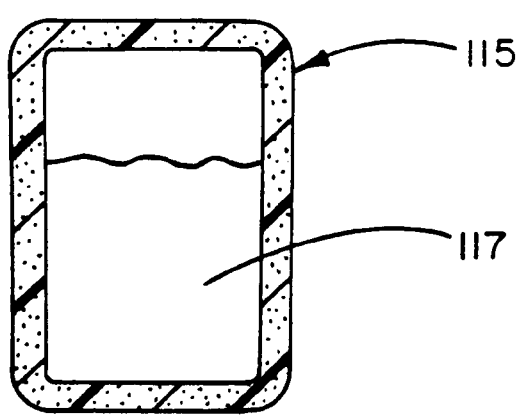
FIG. 10F shows a partial cross section of a fluid container.

Shown in FIG. 10F is a partial cross section of a fluid container 115. The container walls incorporate the material of the present invention and contain a fluid 117.

Figure 11A:
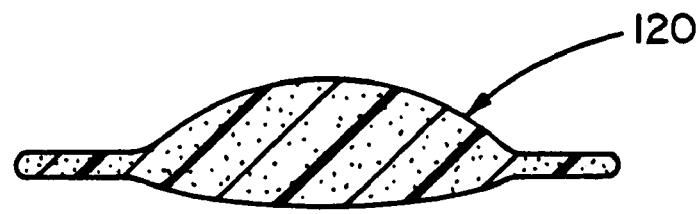
FIG. 11A shows a cross sectional view of a lens.
Figure 11B:
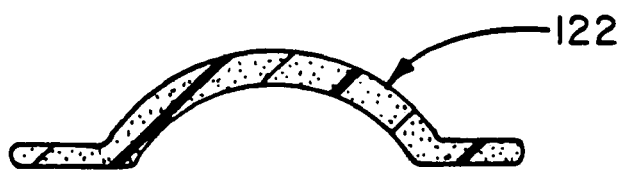
FIG. 11B shows a partial cross sectional view of a lens.

Being a thermoplastic with a relatively low melting temperature, the copolymer of the present invention can be readily injection or compression molded into a variety of shapes. For example, as shown in cross section FIG. 11A, the inventive material can be molded into an implantable lens 120 or cornea. FIG. 11B depicts an optional cross section of an implantable lens. Other molded shapes can include, but are not limited to O-rings, gaskets, implantable augmentation or space filling devices, joint spacers, pump diaphragms, filters or other, long or short term, implantable device.

Two methods have been developed for using the copolymer of the present invention to bond porous materials. Both rely on forming a mechanical interlock within the pores of the material to be bonded. The first bonding method is by thermal bonding. In this method the material of the present invention is compression molded into a thin sheet (0.05 to 0.3 mm thick) and placed in contact with the porous material. The construct is then placed under light pressure (approximately 0.7 KPa) and heated to about 200° C. for 5 minutes. For the porous PTFE materials used to date the resulting bond is stronger than the base material. For instance, in peel tests of a laminate of the material of the present invention and GORE-TEX® cardiovascular patch (available from W. L. Gore and Associates, Flagstaff, Ariz.), cohesive failure of the PTFE occurs at approximately 1.45 N/cm. Therefore the bond strength for this example is greater than 1.45 N/cm.

The second method is by solution bonding. The copolymer of the present invention can be dissolved in Fluorinert FC-75 solvent (3M Corp, Minneapolis, Minn.) in concentrations up to approximately 10%. This solution can be spread onto porous materials which can then be bonded by applying light pressure while the solvent evaporates.

Figure 11C:
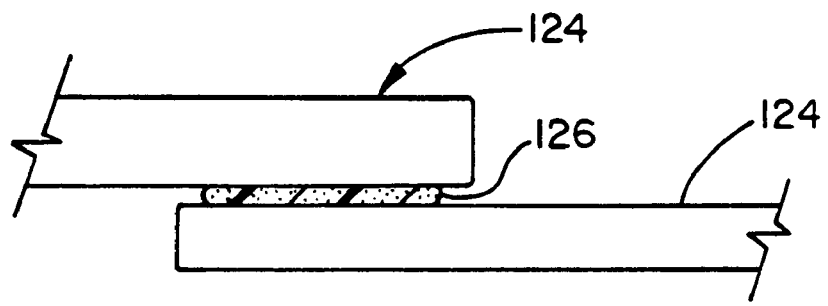
FIGS. 11C and 11D show two different cross sectional views, depicting the use of the copolymer of the present invention as a bonding agent.
Figure 11D:
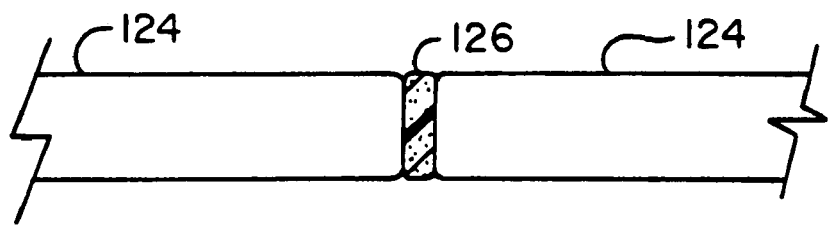

The use of the inventive copolymer as a bonding agent is illustrated in FIGS. 11C and 11D, which show similar or indifferent materials 124, bonded together. The inventive material or bonding agent 126, can be used to bond materials 124 in various bond configurations, for example lap joints or end-to-end joints shown respectively in FIGS. 11C and 11D.

Figure 12A:
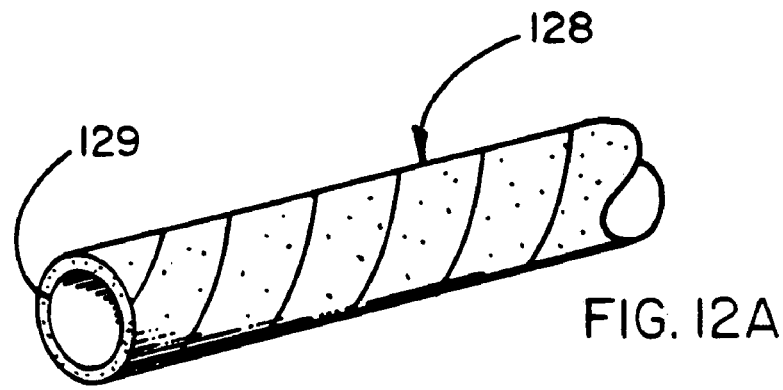
FIGS. 12A through 12F show isometric views of tubular devices made from, or incorporating, the copolymer of the present invention. Shown are single and multi-lumen devices, multilayered devices and solid tubular devices.
Figure 12B:
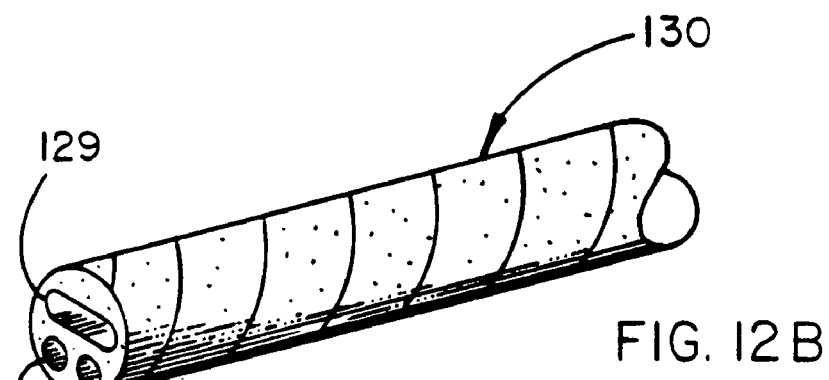

The thermoplastic copolymer of the present invention can be melt extruded into a variety of continuous shapes such as rods, tubes or shapes having non-circular cross sections such as triangles, squares, or any polygon. Such shapes are suited for use as long or short term implantable catheters, urinary catheters, non-implantable catheters, medical, peristaltic pumps, or food grade tubing, sutures or other, long or short term, implantable devices. Shown in FIG. 12A is a single lumen 129 catheter 128 consisting of the inventive material. FIG. 12B depicts a multi lumen 129 catheter 130, extruded from the material of the present invention.

Figure 12C:
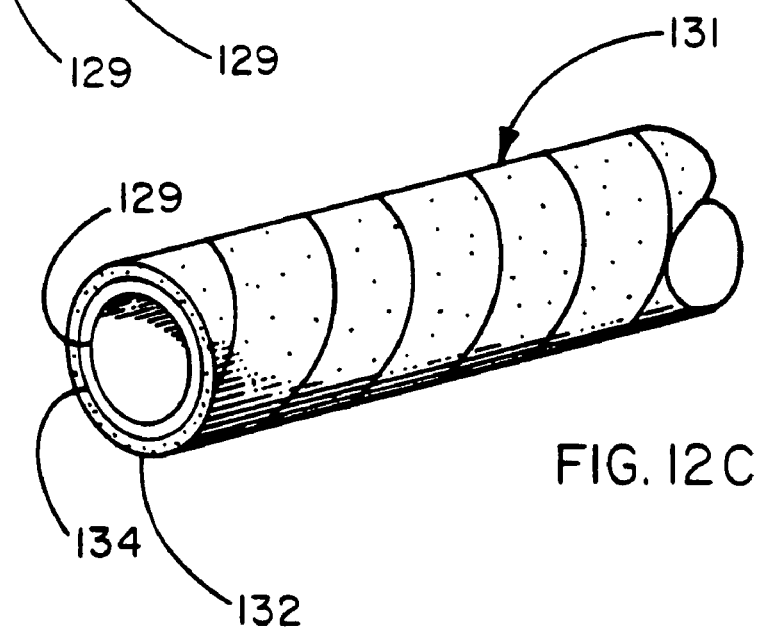
Figure 12D:
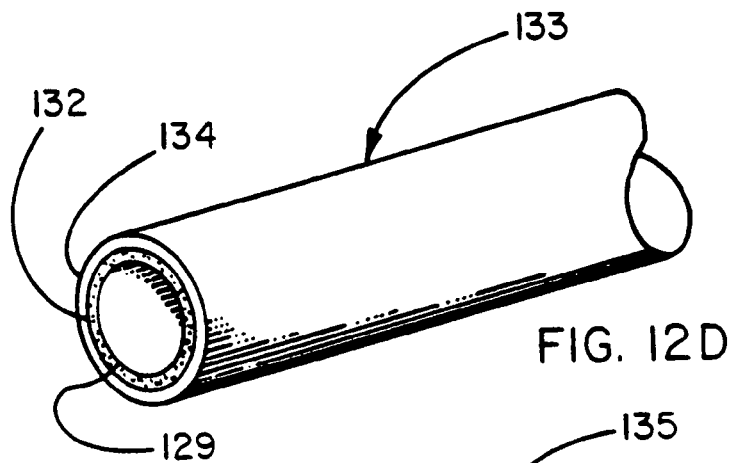

FIG. 12C shows a multilayer tube 131, having a lumen 129, an inner wall or layer 134, and an outer surface or layer 132, comprised of the inventive copolymer. Shown in FIG. 12D is a similar configuration of a tube 133, having a lumen 129, with an inner wall or layer 132 comprised of the inventive copolymer and an outer wall or layer 134.

Figure 12E:
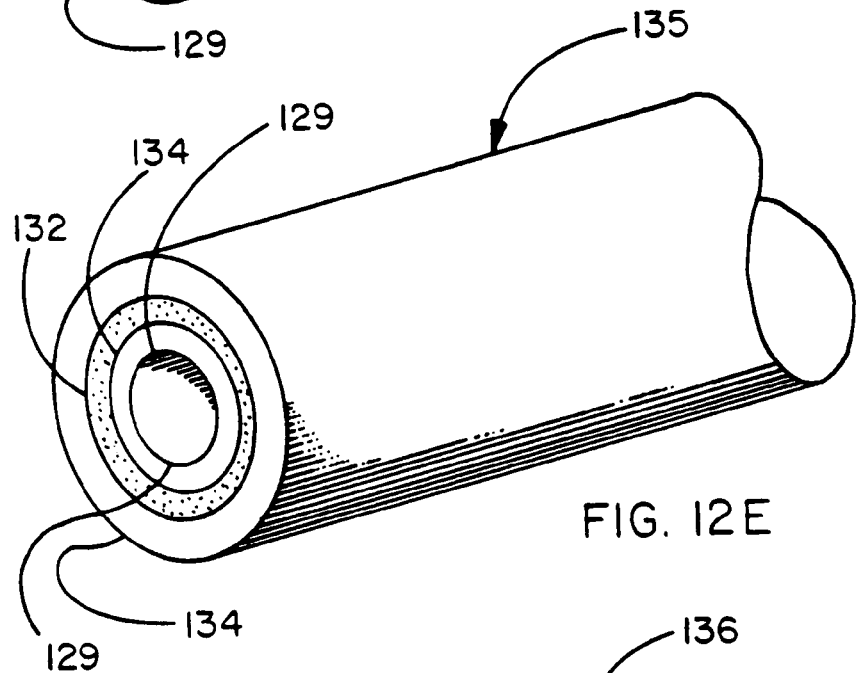

Shown in FIG. 12E is a three layer tube 135 having an inner lumen 129, an inner wall or layer 134, a internal layer 132 of the inventive copolymer and an outer wall or layer 134. Tubing configurations are not limited to these depicted configurations and may include tubes having 4, 5, 6, 7, 8, 9, or 10 layers or walls. Tubes of these or similar configurations can be co-extruded by conventional means or separately extruded then subsequently joined or bonded together, film wrapped then bonded together, or by any other suitable means. Billets can also be formed having concentric layers of the dissimilar materials and concurrently extruded. The thermoplastic nature of the inventive copolymer facilitates the joining of terminations or fittings onto the tubing. The thermoplastic copolymer of the present invention may also be used as a processing aid (e.g., extrusion aid) to facilitate the processing of PTFE. The noncross-linkable copolymer of TFE and PMVE can be blended to PTFE in either dispersion form or dry powder form. The copolymer and PTFE blend can be co-coagulated (from dispersion) to form a coagulum; or dry blended. The resulting blend can thus be fed into an extruder at temperatures between about 500 and 350° C. The resulting extrudate can be further processed by expansion methods to impart node and fibril structures.

Figure 12F:
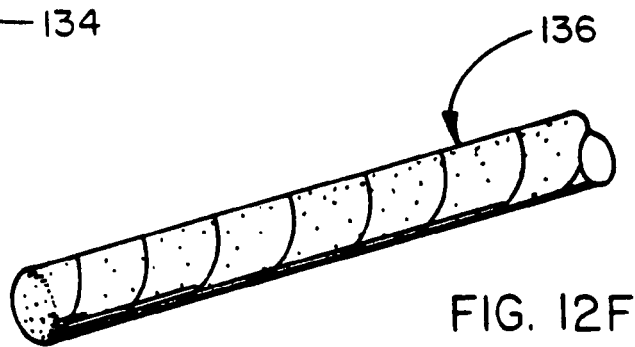

The copolymer of the present invention can be hot melt extruded into rods, fibers, threads or cylinders, or for example, a suture as shown in FIG. 12F. In the application of a suture 136, the thermoplastic nature of the present invention greatly facilitates the attachment of a needle.

Figure 13A:
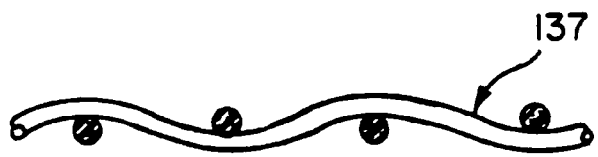
FIGS. 13A and 13B show partial cross sectional views of a mesh device and a mesh device incorporated onto a substrate.
Figure 13B:
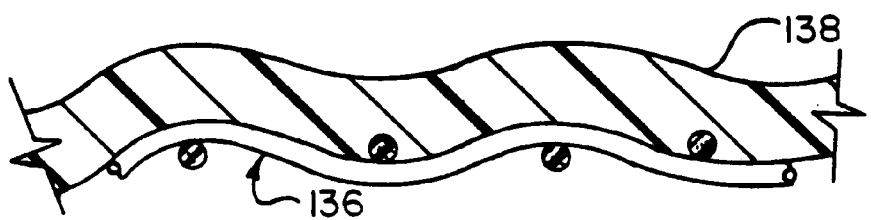

Shown in cross section FIG. 13A is a mesh 137 comprised of the copolymer of the present invention. Conventional methods can be employed to form fibers, weave fibers into various mesh patterns and, due to the thermoplastic properties of the material, be subsequently thermo-compressed to join or bond the fibers. Shown in FIG. 13B is a similar mesh 136, bonded to another material or substrate 138.

Figure 13C:
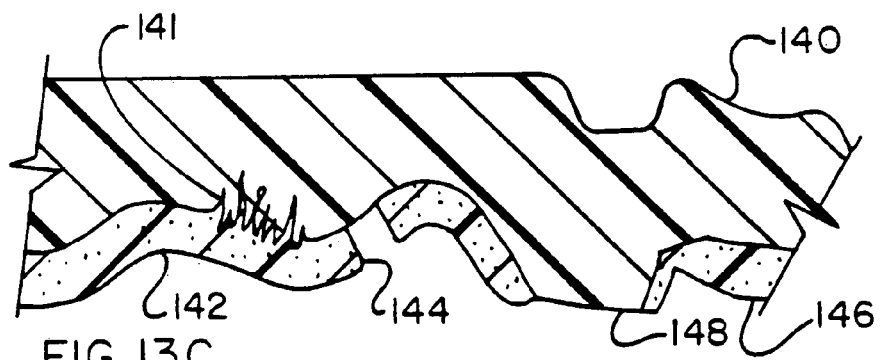
FIG. 13C shows a partial cross section of a substrate having a surface coating of the copolymer of the present invention.

The copolymer of the present invention can be used as a biocompatible, ultra pure surface coating, applied by hot melt dipping or spraying, vacuum thermo-lamination or by applying forms of the inventive material onto a substrate and then thermo-reflowing. Shown in FIG. 13C is a substrate 140, surface coated with the inventive material 142. The coating can have voids or pores 144, open surface areas 148 and varying coating thickness 146. If applied to a porous substrate surface 141, the material of the present invention 142 can serve as a pore filler or sealer. The material of the present invention can also be imbibed into porous substrates, thereby altering the material characteristics of the initial substrate.

Figure 13D:
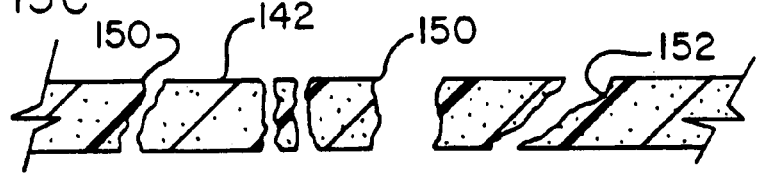
FIGS. 13D and 13E show partial cross sections of porous embodiments of the copolymer of the present invention.
Figure 13E:
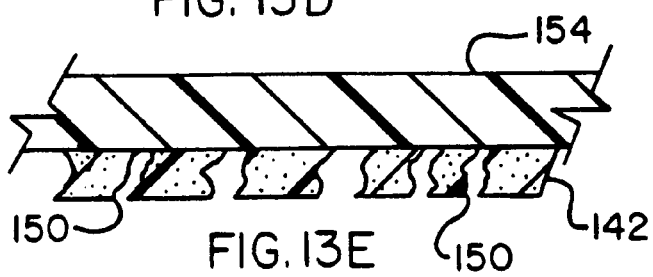

The copolymer of the present invention can be rendered porous by a variety of conventional means which include, but are not limited to, gas, liquid or powder foaming, pre-imbibing, for example salts, into the material and subsequently dissolving the salts, by forcing a heated gas through the softened material or by mechanical or laser perforating. Shown in FIG. 13D, is a cross section of the inventive material 142, having pores or voids 150 of various shapes, angles and sizes, along with pores or voids having varying cross sections 152 along their length. As shown in FIG. 13E, the material of the present invention 142, having pores or voids 150 can be subsequently bonded or attached to a substrate 154.

Shown in FIG. 14A is a foamed open cell 160 cross section of the inventive material. Shown in FIG. 14B is a foamed closed cell 162 cross section of the inventive material.

FIG. 14C depicts a cross section of the material 164 of the present invention after impregnation with the same, similar or dissimilar material 166.

Shown in FIG. 15 is a node 170 and fibril 172 structure, for example that of expanded PTFE, imbibed with the material 174 of the present invention.

FIG. 16 depicts a cross section of a bone joint spacer 176, having locating stems 178 consisting of the material of the present invention.

Shown in FIG. 17A is a cross section of a stent support structure 180, coated with the material 182 of the present invention. FIG. 17B shows a cross section of a stent support structure 180, wherein the stent is externally covered with the material 182 of the present invention. Similarly, as shown in FIG. 17C the stent support structure 180 can be internally coated with the material 182 of the present invention.

Shown in FIG. 18 is a typical stress strain to break profile for materials of the present invention. The stress strain curve 200 of materials typical of the present invention, has an ultimate tensile strength 204 and a strain to break 206.

Shown in FIG. 19 is a typical stress, strain to 100%, profile showing the recovery or resilient characteristics for materials of the present invention. The stress strain curve under load 208 continues to 100% strain 212. The stress strain curve under relaxation 210, continues to zero stress, where the residual strain 214 can be quantified.

While particular embodiments of the present invention have been illustrated and described herein, the present invention is not limited to such illustration and description. It should be understood that additional embodiments may be

We claim:

1. An article comprising a composite material of porous expanded polytetrafluoroethylene and a copolymer of tetrafluoroethylene and perfluoro(methyl vinyl ether); wherein the copolymer is a thermoplastic consisting essentially of between about 40 and 80 weight percent perfluoromethyl vinyl ether and complementally 60 and 20 weight percent tetrafluoroethylene, said copolymer containing fewer than about 50 parts per million by weight of fluorinated anionic surfactant.

2. The article of claim 1 wherein the copolymer has a matrix tensile strength greater than about 35 MPa.

3. The article of claim 2 wherein the copolymer has a matrix tensile strength greater than about 50 MPa.

4. The article of claim 3 wherein the copolymer has a matrix tensile strength greater than about 70 MPa.

5. The article of claim 4 wherein the copolymer has a matrix tensile strength greater than about 85 MPa.

6. The article of claim 5 wherein the copolymer has a matrix tensile strength greater than about 95 MPa.

7. The article of claim 1 wherein said porous expanded polytetrafluoroethylene is laminated to said copolymer.

8. The article of claim 1 wherein said copolymer comprises a coating provided on the porous expanded polytetrafluoroethylene.

9. The article of claim 1 wherein said copolymer comprises a bonding agent for bonding other materials together.

10. The article according to claim 1 wherein said copolymer contains fewer than about 30 parts per million by weight of fluorinated anionic surfactant.

11. The article according to claim 10 wherein said copolymer contains fewer than about 10 parts per million by weight of fluorinated anionic surfactant.

12. The article according to claim 11 wherein said copolymer contains fewer than about 5 parts per million by weight of fluorinated anionic surfactant.

13. The article according to claim 12 wherein said copolymer contains fewer than about 1 part per million by weight of fluorinated anionic surfactant.

14. The article of claim 1 wherein said fluorinated anionic surfactant is ammonium perfluoro octanoate.

15. The article of claim 10 wherein said fluorinated anionic surfactant is ammonium perfluoro octanoate.

16. The article of claim 11 wherein said fluorinated anionic surfactant is ammonium perfluoro octanoate.

17. The article of claim 12 wherein said fluorinated anionic surfactant is ammonium perfluoro octanoate.

18. The article of claim 13 wherein said fluorinated anionic surfactant is ammonium perfluoro octanoate.

19. The article of claim 1 wherein said article comprises a container.

20. The article of claim 1 wherein said article comprises a gasket.

* * * * *